US007759419B2

(12) United States Patent
Stoffer et al.

(10) Patent No.: US 7,759,419 B2
(45) Date of Patent: *Jul. 20, 2010

(54) CORROSION RESISTANT COATINGS

(75) Inventors: James Stoffer, Rolla, MO (US); Thomas O'Keefe, Rolla, MO (US); Eric Morris, Irvine, CA (US); Pu Yu, Rolla, MO (US); Scott A. Hayes, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/758,972

(22) Filed: Jan. 16, 2004

(65) Prior Publication Data

US 2004/0249043 A1 Dec. 9, 2004

Related U.S. Application Data

(63) Continuation-in-part of application No. 10/346,374, filed on Jan. 17, 2003.

(60) Provisional application No. 60/452,843, filed on Mar. 7, 2003.

(51) Int. Cl.
*C23F 11/00* (2006.01)
*C08K 3/10* (2006.01)

(52) U.S. Cl. ............... 524/403; 252/387; 524/167; 524/238; 524/423; 524/588; 524/612

(58) Field of Classification Search ............ 524/401, 524/403, 423, 430, 588, 612, 167, 238; 252/387
See application file for complete search history.

(56) References Cited

U.S. PATENT DOCUMENTS

| | | | |
|---|---|---|---|
| 2,576,845 A | 11/1951 | McDonald | |
| 3,790,453 A | 2/1974 | Wanamaker et al. | |
| 3,837,894 A * | 9/1974 | Tucker, Jr. | 427/419.2 |
| 3,951,667 A | 4/1976 | Kogure et al. | 106/1 |
| 3,990,920 A | 11/1976 | De Ridder et al. | 148/6.2 |
| 4,212,674 A | 7/1980 | Strauch | 106/14.05 |
| 4,283,312 A | 8/1981 | Crivello | 260/18 EP |
| 4,370,256 A * | 1/1983 | Oakes | 252/391 |
| 4,405,763 A | 9/1983 | Kooymans et al. | 525/438 |
| 4,474,607 A | 10/1984 | Goldie et al. | 106/14.39 |
| 4,488,578 A | 12/1984 | Tseung et al. | 138/146 |
| 4,491,611 A | 1/1985 | Barnhoorn et al. | 427/386 |
| 4,497,667 A | 2/1985 | Vashi | 148/6.15 R |
| 4,501,832 A | 2/1985 | Albers | |
| 4,517,030 A | 5/1985 | Yamamoto et al. | 148/6.15 R |
| 4,522,879 A | 6/1985 | Krueger | |
| 4,537,805 A | 8/1985 | Lin | 427/54.1 |
| 4,544,581 A | 10/1985 | Pelloski | 427/383.7 |
| 4,749,550 A | 6/1988 | Goldie et al. | 422/19 |
| 4,849,297 A | 7/1989 | Mansell et al. | 428/457 |
| 4,869,964 A | 9/1989 | Mazany | 428/418 |
| 4,876,305 A | 10/1989 | Mazany | 524/401 |
| 4,895,881 A | 1/1990 | Bigner | 523/122 |
| 4,988,755 A | 1/1991 | Dickens, Jr. et al. | 524/401 |
| 4,999,250 A | 3/1991 | Richardson et al. | 428/457 |
| 5,013,381 A | 5/1991 | Cayless et al. | 156/281 |
| 5,037,478 A | 8/1991 | Okai et al. | 106/479 |
| 5,041,241 A | 8/1991 | Fletcher | 252/387 |
| 5,041,486 A | 8/1991 | Kissel | 524/377 |
| 5,041,487 A | 8/1991 | Kissel | 524/377 |
| 5,061,314 A | 10/1991 | Collier et al. | 106/14.05 |
| 5,064,468 A | 11/1991 | Okai et al. | 106/14.12 |
| 5,089,066 A | 2/1992 | Hamada et al. | 148/302 |
| 5,162,413 A | 11/1992 | Kissel | 524/337 |
| 5,166,248 A | 11/1992 | Kissel | 524/398 |
| 5,173,206 A | 12/1992 | Dickens, Jr. et al. | 252/62.54 |
| 5,175,202 A | 12/1992 | Kissel | 524/398 |
| 5,192,374 A | 3/1993 | Kindler | |
| 5,198,487 A | 3/1993 | Kissel | 524/403 |
| 5,221,371 A | 6/1993 | Miller | |
| 5,244,956 A | 9/1993 | Miller | 524/403 |
| 5,298,148 A | 3/1994 | Yasuoka et al. | 205/50 |
| 5,322,560 A | 6/1994 | DePue et al. | 106/404 |
| 5,322,864 A | 6/1994 | Sugimoto et al. | 523/457 |
| 5,338,347 A | 8/1994 | Rohr et al. | 106/14.44 |

(Continued)

FOREIGN PATENT DOCUMENTS

| | | |
|---|---|---|
| AU | 2001295609 B8 | 4/2002 |
| EP | 0902103 A1 | 3/1999 |
| EP | 1125989 A1 | 8/2001 |
| FR | 2058759 | 5/1971 |
| JP | 55065326 A | 5/1980 |

(Continued)

OTHER PUBLICATIONS

Machine Translation of JP 05-117589 A, May 14, 1993.*
Aldykiewicz, Jr., et al., "Studies of the Formation of Cerium Rich Protective Films Using X-Ray Absorption Near-Edge Spectroscopy and Rotating Disk Electrode Methods", *J. Electrochem. Soc.*, vol. 143, No. 1, (Jan. 1996), 147-153.

(Continued)

*Primary Examiner*—Vickey Nerangis
(74) *Attorney, Agent, or Firm*—Clise, Billion & Cyr, P.A.

(57) ABSTRACT

A coating composition comprising an effective corrosion-inhibiting amount of a rare earth compound, a neutral to slightly acidic generating extender or an acidic generating extender, or combinations thereof is provided. In one embodiment, the corrosion-inhibiting components are combined with other components such as extenders, amino acids and amino acid derivatives, gelatin and gelatin derivatives, organic-based exchange resins, and combinations thereof, to enhance the corrosion resistance of the resultant coating film. The coating compositions have good adhesion to substrates such as metals, including aluminum and aluminum alloys.

78 Claims, No Drawings

U.S. PATENT DOCUMENTS

| | | | |
|---|---|---|---|
| 5,362,335 A | 11/1994 | Rungta | |
| 5,407,471 A | 4/1995 | Rohr et al. | 106/14.44 |
| 5,437,937 A | 8/1995 | Cayless | 428/626 |
| 5,458,678 A | 10/1995 | Armstrong et al. | 106/14.41 |
| 5,531,931 A * | 7/1996 | Koefod | 252/387 |
| 5,540,981 A | 7/1996 | Gallagher et al. | 428/220 |
| 5,587,059 A | 12/1996 | Yamoto et al. | |
| 5,587,142 A | 12/1996 | Horwitz et al. | 423/658.5 |
| 5,635,548 A | 6/1997 | Kittle et al. | 523/220 |
| 5,637,641 A | 6/1997 | Becker et al. | 525/102 |
| 5,656,074 A | 8/1997 | Collier et al. | 106/454 |
| 5,661,219 A | 8/1997 | Nakane et al. | 525/166 |
| 5,707,465 A | 1/1998 | Bibber | |
| 5,770,216 A | 6/1998 | Mitchnick et al. | 428/402 |
| 5,807,954 A | 9/1998 | Becker et al. | 528/25 |
| 5,814,410 A | 9/1998 | Singer et al. | |
| 5,866,652 A | 2/1999 | Hager et al. | 524/701 |
| 5,868,819 A | 2/1999 | Guhde et al. | 106/14.14 |
| 5,868,820 A | 2/1999 | Claffey | 106/14.44 |
| 5,871,839 A | 2/1999 | Boyd et al. | |
| 5,897,948 A | 4/1999 | Sakon et al. | 428/328 |
| 5,932,083 A | 8/1999 | Stoffer et al. | |
| 5,958,578 A | 9/1999 | Blohowiak et al. | |
| 5,964,928 A | 10/1999 | Tomlinson | 106/14.21 |
| 5,996,500 A | 12/1999 | Findley | 102/202.8 |
| 6,022,425 A | 2/2000 | Nelson et al. | |
| 6,030,571 A | 2/2000 | Nakane et al. | 264/331.12 |
| 6,068,711 A | 5/2000 | Lu et al. | |
| 6,077,885 A | 6/2000 | Hager et al. | 523/445 |
| 6,139,610 A | 10/2000 | Sinko | 106/14.44 |
| 6,168,868 B1 | 1/2001 | Hauser et al. | 428/457 |
| 6,174,609 B1 | 1/2001 | Katsumi et al. | 428/450 |
| 6,176,907 B1 | 1/2001 | Glausch | |
| 6,190,780 B1 | 2/2001 | Shoji et al. | 428/472 |
| 6,200,672 B1 | 3/2001 | Tadokoro et al. | 428/328 |
| 6,211,285 B1 | 4/2001 | Grunbauer et al. | 524/591 |
| 6,214,132 B1 | 4/2001 | Nakayama et al. | 148/254 |
| 6,217,674 B1 | 4/2001 | Gray et al. | 148/247 |
| 6,221,473 B1 | 4/2001 | Aubert et al. | 428/221 |
| 6,228,513 B1 | 5/2001 | Jaslier et al. | 428/639 |
| 6,248,184 B1 | 6/2001 | Dull et al. | 148/275 |
| 6,254,980 B1 | 7/2001 | Tadokoro et al. | 428/323 |
| 6,270,884 B1 | 8/2001 | Guhde et al. | 428/323 |
| 6,294,006 B1 | 9/2001 | Andou | 106/14.05 |
| 6,306,276 B1 | 10/2001 | Nobe et al. | |
| 6,312,812 B1 | 11/2001 | Hauser et al. | 428/412 |
| 6,312,813 B1 | 11/2001 | Miyatake et al. | 428/418 |
| 6,332,937 B1 | 12/2001 | Jaslier et al. | 148/518 |
| 6,334,940 B1 | 1/2002 | Muramoto et al. | 204/488 |
| 6,342,554 B1 | 1/2002 | Kishikawa et al. | 524/407 |
| 6,383,307 B1 | 5/2002 | Kucera et al. | 148/251 |
| 6,387,498 B1 | 5/2002 | Coulter et al. | 428/403 |
| 6,457,943 B1 | 10/2002 | Olsen et al. | 416/238 |
| 6,476,102 B1 | 11/2002 | Chung et al. | 523/409 |
| 6,478,860 B1 | 11/2002 | Nakayama et al. | 106/14.05 |
| 6,485,549 B1 | 11/2002 | Novak et al. | 106/14.44 |
| 6,506,245 B1 | 1/2003 | Kinney et al. | 106/493 |
| 6,506,899 B1 | 1/2003 | Simms | 544/222 |
| 6,511,532 B2 | 1/2003 | Matzdorf et al. | |
| 6,537,678 B1 | 3/2003 | Putnam et al. | 428/469 |
| 6,589,324 B2 | 7/2003 | Kamo et al. | 106/14.12 |
| 6,630,523 B2 | 10/2003 | Hagiwara et al. | |
| 6,716,370 B2 | 4/2004 | Kendig | |
| 6,818,116 B2 | 11/2004 | Stoffer et al. | |
| 7,601,425 B2 | 10/2009 | Stoffer et al. | |
| 2001/0024729 A1 | 9/2001 | Heimann et al. | 428/469 |
| 2001/0041757 A1 | 11/2001 | Sakamoto et al. | 523/514 |
| 2001/0055669 A1 | 12/2001 | Schultz et al. | 428/173 |
| 2002/0003093 A1 | 1/2002 | Dull et al. | 205/203 |
| 2002/0006524 A1 | 1/2002 | Jaslier et al. | 428/632 |
| 2002/0023694 A1 | 2/2002 | Kucera et al. | 148/240 |
| 2002/0043649 A1 | 4/2002 | Mansfield et al. | 252/387 |
| 2002/0082338 A1 | 6/2002 | Furuya et al. | |
| 2002/0179189 A1 | 12/2002 | Homma et al. | |
| 2002/0193485 A1 | 12/2002 | Hagiwara et al. | |
| 2003/0024432 A1 | 2/2003 | Chung et al. | |
| 2003/0044515 A1 | 3/2003 | Sandhage | |
| 2003/0054193 A1 | 3/2003 | McCollum et al. | |
| 2003/0082368 A1 * | 5/2003 | Reuter et al. | 428/332 |
| 2003/0221590 A1 | 12/2003 | Sturgill et al. | |
| 2003/0230363 A1 | 12/2003 | Sturgill et al. | |
| 2003/0234063 A1 | 12/2003 | Sturgill et al. | |
| 2004/0005478 A1 | 1/2004 | Kendig et al. | |
| 2004/0011252 A1 | 1/2004 | Sturgill et al. | |
| 2004/0016363 A1 | 1/2004 | Phelps et al. | |
| 2004/0016910 A1 | 1/2004 | Phelps et al. | |
| 2004/0020568 A1 | 2/2004 | Phelps et al. | |
| 2004/0026260 A1 | 2/2004 | Stoffer et al. | |
| 2004/0026261 A1 | 2/2004 | Stoffer et al. | |
| 2004/0028820 A1 | 2/2004 | Stoffer et al. | |
| 2004/0062873 A1 * | 4/2004 | Jung et al. | 427/407.1 |
| 2004/0104377 A1 | 6/2004 | Phelps et al. | |
| 2004/0175587 A1 | 9/2004 | Kendig | |
| 2004/0186201 A1 | 9/2004 | Stoffer et al. | |
| 2006/0063872 A1 * | 3/2006 | Teachout et al. | 524/417 |

FOREIGN PATENT DOCUMENTS

| | | |
|---|---|---|
| JP | 01-319574 | 12/1989 |
| JP | 05-117589 | 5/1993 |
| JP | 05117589 A * | 5/1993 |
| WO | WO-8806639 | 9/1988 |
| WO | WO-0214586 A1 | 2/2002 |
| WO | WO-0231064 A1 | 4/2002 |
| WO | WO-2004065497 A3 | 8/2004 |
| WO | WO-2004065498 A3 | 8/2004 |

OTHER PUBLICATIONS

Aldykiewicz, Jr., et al., "The Investigation of Cerium as a Cathodic Inhibitor for Aluminum-Copper Alloys", *J. Electrochem. Soc.*, vol. 142, No. 10, (Oct. 1995), 3342-3350.

Davenport, et al., "X-Ray Absorption Study of Cerium in the Passive Film Aluminum", *J. Electrochem. Soc.*, vol. 136, No. 6, (Jun. 1989), 1837-1838.

Davenport, et al., "Xanes Investigation of the Role of Cerium Compounds as Corrosion Inhibitors for Aluminum", *Corrosion Science*, vol. 32, No. 5/6, (1991), 653-663.

Fujita, et al., "Fabrication of Co-Ce-O Films by Metal-Oxide Co-Electrodeposition Method From Reaction Solution Including A Complexing Agent", *Nippon Oyo Jiki Gakkaishi*, vol. 25, No. 4-2, (2001), 883-886.

Hinton, et al., "Cerium Conversion Coatings for the Corrosion Protection of Aluminum", *Materials Forum*, vol. 9, No. 4, (1986), 162-173.

Hinton, et al., "Cerium Oxide Coatings for Corrosion Protection of Aluminum Alloys", *Materials Australasia*, (Jan./Feb. 1987),18-20.

Hinton, "Corrosion Inhibition with Rare Earth Metal Salts", *Journal of Alloys and Compounds*, 180, (1992), 15-25.

Hinton, "New Approaches to Corrosion Inhibitionwith Rare Earth Metal Salts", *Corrosion 89*, Paper 170, NACE, (Apr. 17-21, 1989).

Hinton, et al., "The Corrosion Inhibition of Zinc with Cerous Chloride", *Corrosion Science*, 29 (1989), 967-984.

Hinton, et al., "The Inhibition of Aluminium Alloys Corrosion by Cerous Cations", *Metals Forum*, vol. 7, No. 4, (1984), 211-217.

Mansfield, et al., "Corrosion Protection of Al Alloys and Al based Metal Matrix", *Corrosion 88*, Paper 380, NACE,(Mar. 21-25, 1988).

Weiser, *The Hydrous Oxides*, McGraw-Hill Book Company, Inc., (1926), 253-259.

Hayes, S., et al., "Environmentally compliant aircraft coatings", *Polymer Materials Science and Engineering*, 85, (2001),140-141.

Hayes, S. A., et al., "The phase stability of cerium species in aqueous systems—I. E-pH diagram for the Ce-HCIO4-H20 system", *Journal of the Electrochemical Society*, 149(12), (Dec. 2002),PC623-C630.

Hinton, B., et al., "The corrosion protection properties of an hydrated cerium oxide coating on aluminum", *Proc. 13th Int. Corros. Congr.*, (1996),Paper 337/1-Paper 337/7.

Morris, E. L., et al., "The use of inhibitors to improve the corrosion protection of E-coat systems on aluminum alloys", *Polymer Materials Science and Engineering*, 78, (1998),172-173.

Pourbaix, M., "Atlas of Electrochemical Equilibria in Aqueous Solutions", *Oxford*, New York, (1966),183-197.

Schuman, Thomas P., et al., "Cerium-based Inhibitors of Aluminum Corrosion", *Proceedings of the Waterborne, Higher Solids, and Powder Coatings Symposium*, (Feb. 6-8, 2002),371-382.

Schuman, Thomas P., et al., "The Practical Use of SRET in Surface Corrosion Assessments", *Gate Coatings Symposium*, St. Louis, MO, (Jun. 2002).

Shahin, A , et al., "XPS characterization of Ce(III-IV) complexes", *Abstracts of Papers of the American Chemical Society*, 224(1), (2002).

\* cited by examiner

CORROSION RESISTANT COATINGS

CROSS-REFERENCE TO RELATED APPLICATIONS

This application is a continuation-in-part of U.S. patent application Ser. No. 10/346,374 filed on Jan. 17, 2003, which is hereby incorporated by reference in its entirety. This application also claims the benefit under 35 U.S.C. 119 (e) of U.S. Provisional Application No. 60/452,843 filed on Mar. 7, 2003, which is hereby incorporated by reference in its entirety.

STATEMENT OF GOVERNMENT RIGHTS

This invention was made with Government support under grant number AFOSRF49620-96-0140 and F33615-97-D5009 awarded by the United States Air Force. The Government may have certain rights in this invention.

TECHNICAL FIELD

This invention relates to coatings, and, in particular, this invention relates to corrosion resistant coatings.

BACKGROUND

Coatings are employed for a number of reasons. Product coatings or industrial coatings are typically applied in a factory on a given substrate or product, such as appliances, automobiles, aircraft, and the like. Many industries, including the aircraft industry, typically employ coating systems that provide both corrosion protection and enhanced performance.

In order to improve the corrosion resistance of a metal substrate, corrosion inhibitive pigments or additives are typically used in the coatings applied to the substrate. A common corrosion inhibitive pigment is strontium chromate, which provides excellent corrosion resistance. However, in recent years there has been widespread concern over the use of chromates, as they are known to be highly toxic and carcinogenic. Furthermore, the disposal of chromate materials is becoming increasingly difficult as municipal and government regulations are becoming more stringent.

As a result, there have been attempts to produce corrosion resistant coatings by using environmentally acceptable corrosion inhibitive pigments or additives. However, these coatings are problematic in that some of the pigments or additives used are either not compatible with the paint or cause the paint to peel off the substrate. Some are actually known to accelerate the corrosion process.

Thus there is a need to provide corrosion resistant coatings that are effective, yet not based on chromates.

SUMMARY

The present invention relates to aqueous or solvent borne coating compositions containing rare earth compounds, such as rare earth oxides, hydroxides, mixed oxides, solid solution oxides, hydrated oxides, salts, triflates, carbonates, and complexes alone or in combination with other components, having corrosion resistant properties with good adhesion to metals, including aluminum and aluminum alloys, bare and galvanized steel, zinc, magnesium and magnesium alloys. The invention further relates to processes for preparing the coating compositions containing rare earth compounds, alone or in combination with other components.

The present invention additionally relates to aqueous or solvent borne coating compositions containing one or more neutral to slightly acidic extenders or acidic extenders, such as metal salts (e.g., metal sulfates), wherein the metal is selected from the group consisting of calcium, strontium, and barium, alone or in combination with other components, having corrosion resistant properties with good adhesion to substrates such as metals, including aluminum and aluminum alloys, bare and galvanized steel, zinc, magnesium and magnesium alloys. In most embodiments, the coating further contains a binder. The invention further relates to process for preparing such coating compositions containing neutral to slightly acidic extenders or acidic extenders, alone or in combination with other components.

In one embodiment, a coating system comprising one or more pretreatment coatings applied to a substrate to form a pretreated substrate; and an effective corrosion-inhibiting amount of a rare earth compound, a neutral to slightly acidic generating extender and/or an acidic generating extender is provided. In one embodiment, the substrate is not pretreated. In one embodiment, the coating system includes a topcoat. In one embodiment the coating system is a resin coating. In one embodiment, the coating system is selected from the group consisting of a UV-coating system, electrolytic coating (e-coating) system, appliqué, powder coating system and microwave coating system. In one embodiment, the substrate is a metal substrate selected from the group consisting of aluminum and aluminum alloys, bare and galvanized steel, zinc (intended to include zinc alloys), magnesium and magnesium alloys, copper and bronze.

The invention additionally relates to methods of using a coating composition comprising providing a substrate to be coated and coating the substrate with a coating composition having an effective corrosion-inhibiting amount of a rare earth compound, a neutral to slightly acidic generating extender or an acidic generating extender. In one embodiment, the coating is applied by any conventional method, including, but not limited to, spraying, brushing, rolling and dipping. In one embodiment, the method further comprises applying a topcoat.

The coatings described herein have excellent corrosion resistance performance, while maintaining acceptable levels of paint adhesion properties. The coating compositions are useful in many industries, including, but not limited to, the aerospace and aircraft industries.

DETAILED DESCRIPTION OF THE EMBODIMENTS

In the following detailed description, embodiments are described in sufficient detail to enable those skilled in the art to practice the invention. Other embodiments may be utilized and structural, logical and other changes may be made without departing from the spirit and scope of the present invention. The following detailed description is, therefore, not to be taken in a limiting sense. The detailed description that follows begins with a definition section followed by a description of various embodiments of the invention. A series of examples is presented next followed by a brief conclusion.

DEFINITIONS

As used herein, the term "substrate" refers to a structure having a surface that can be cleaned and/or protected and/or modified to provide unique properties. A "substrate" is not limited to any particular type of material, although in terms of applying a corrosion inhibiting coating, such substrates are typically metal. However, corrosion inhibiting coatings can also be applied to other substrates, such as a polymeric substrate (e.g., coated metallic substrate). A corrosion inhibiting coating can also be applied to a composite substrate, such as a substrate made with carbon fibers and epoxy resin. Although a composite substrate does not corrode, a corrosion inhibiting coating can still be used with a composite substrate to provide surface protection and/or other unique properties to the substrate, although the coating must be compatible with the substrate material. In some instances, although the majority of the substrate can be made from a composite material and therefore not need protection from corrosion, the presence of other metallic surfaces within the desired coating area, e.g., metallic rivets, requires the use of a corrosion inhibiting coating.

As used herein, the term "extender" or "extender pigment" when used without qualification, refers to a type of pigment that is typically incorporated into a paint formulation to provide volume to the final resulting coating after paint curing, although it can be added for other reasons, such as to reduce cost. An extender can additionally or alternatively be an active component in making a total system more corrosion resistant. Extenders which add volume are often referred to as "fillers" or "extenders/fillers."

As used herein, the term "neutral to slightly acidic generating extender", i.e., "neutral to slightly acidic generating additive", refers to a metal cation and a corresponding oxyanion (meaning those anions having an oxygen combined with one or more nonmetals). Preferred but not required extenders are sulfur, phosphorus and silicon oxyanion-containing compounds. Of particular interest are sulfur, phosphorus and silicon oxyanion-containing salts. A neutral to slightly acidic generating extender can be used alone or in combination with other components to generate a pH environment of between about 4 to about 8 in a coating composition (with the pH of the coating composition determined by standard methods and concentrations known to those of skill in the art). This environment appears to help enhance and optimize transport of the particular inhibitor species being used, from the coating composition to areas of exposed underlying substrate. A neutral to slightly acidic generating extender can itself be acidic, neutral or basic (e.g., $Na_2HPO_4$) and can also add extender properties to the coating composition. In most instances, a neutral to slightly acidic generating extender does not substantially solubilize in the coating composition, thereby adding volume to the composition. Examples of neutral to slightly acidic generating extenders include, but are not limited to, sulfates, sulfites, silicates, phosphates, phosphites, phosphonates, hydrogen sulfate, hydrogen sulfite, mono and di-hydrogen phosphate, mono and di-hydrogen phosphites and mono hydrogen phosphonate. Further examples include oxyphosphorus compounds, such as cerous phosphate and some Group IIA sulfates, such as calcium sulfate, strontium sulfate and the like. However, it is manifestly intended to include within this term neutral to slightly acidic generating extenders, i.e., additives, which are substantially soluble and therefore do not add volume to the composition. Examples include certain sulfates known in the art to not be useful in adding volume but which have shown surprisingly good results as corrosion inhibitors, such as magnesium sulfate and some Group IA sulfates. The precise amount of neutral to slightly acidic generating extender needed to generate the desired pH in the composition will vary depending the type and amount of binders, solvents, pigments and other additives, including other types of extenders present in the coating composition.

As used herein, the term "acidic generating extender", i.e., "acidic generating additive," refers to a metal cation and a corresponding oxyanion (meaning those anions having an oxygen combined with one or more nonmetals). Preferred but not required extenders are sulfur, phosphorus and silicon oxyanion-containing compounds. Of particular interest are sulfur, phosphorus and silicon oxyanion-containing salts. An acidic generating extender can be used alone or in combination with other components to generate a pH environment of less than between about 2 to about 4 in a coating composition (with the pH of the coating composition determined by standard methods and concentrations known to those of skill in the art). This environment appears to help enhance and optimize transport of the particular inhibitor species being used, from the coating composition to areas of exposed underlying substrate. An acidic generating extender can itself be acidic or neutral and can also add extender properties to the coating composition. Examples of compounds that are capable of generating a pH environment of between about 2 to about 4 include, but are not limited to certain hydrogen sulfates such as calcium hydrogen sulfate, calcium hydrogen phosphate and calcium di-hydrogen phosphate. Again, it is manifestly intended to include within this term acidic generating extenders that are substantially soluble, thereby not adding volume to the composition. It is possible that the same compound can be properly categorized as both an "acidic generating extender" and a "neutral to slightly acidic generating extender", since it is capable of generating either environment. One example of a compound that can generate either environment includes, but is not limited to, calcium hydrogen phosphate. Additionally, the precise amount of acidic generating extender needed to generate the desired pH in the composition will vary depending on the type and amount of binders, solvents, pigments and other additives present.

As used herein, the term "substantially soluble" refers to a solubility level of more than about one (1) mole per liter of water (mol/L).

As used herein, the term "not substantially soluble" refers to a solubility level of less than about one (1) mol/L.

As used herein, the term "coating" refers to a polymeric material (organic or inorganic) that can be applied either as a liquid (e.g., paint) or solid (e.g., powder) to a substrate to form a polymeric film. Such polymeric materials include, but are not limited to, powder coatings, paints, sealants, conducting polymers, sol gels (e.g. Boegel™ made by Boeing Co. having offices in Chicago, Ill.), silicates, silicones, zirconates, titonates, and the like. A "coating" is comprised of a complex mixture of binders, solvents, pigments and additives. Many coatings have one or more substances from each of the four categories. Coating properties, such as gloss and color, are related to the film surface, i.e., as a two-dimensional entity. However, the bulk properties of a coating are related to its three-dimensional structure. Phase continuity is a volume concept, and the coating performance is dependent on the integrity of the binder phase.

As used herein, the term "binder" refers to any film-forming polymeric material which can be used to make coatings. The polymeric material can be either organic or inorganic. Organic binders have a carbon backbone and inorganic binders generally have a silicone backbone. Organic binders are made up of organic monomers and oligomers from which the binders generally derive their names. Examples of these would be acrylic, epoxy, urethane, melamine, and so forth. Binders include epoxy-based resin binders such as a water reducible epoxy-polyamide system (for organic polymeric materials) or non epoxy-based resin binders such as urethanes, ureas, acrylates, alkyds, melamines, polyesters, vinyls, vinyl esters, silicones, siloxanes, silicates, sulfides, silicate polymers, epoxy novilacs, epoxy phenolics, drying oils, hydrocarbon polymers, and the like.

As used herein, the term "weight percent (wt %)" when used without qualification, typically refers to the weight percent of a particular solid component, e.g., pigment, extender, etc., as compared with all solid components present, excluding polymeric resins. For example, if the only solid component present in the coating is a corrosion-inhibiting carbon pigment, the corrosion-inhibiting carbon pigment is considered to have a wt % of 100.

As used herein, the term "mixed oxide" refers to a solid solution of a single element having multiple oxidation states and is not intended to refer to a mixture of oxides.

As used herein, the term "topcoat" refers to a mixture of a binder(s), which can be an organic or inorganic based polymer or a blend of polymers, typically at least one pigment, can optionally contain at least one solvent or mixture of solvents, and can optionally contain at least one curing agent. A topcoat is typically the coating layer in a single or multi-layer coating system whose outer surface is exposed to the atmosphere or environment, and its inner surface is in contact with another coating layer or polymeric substrate. One example of a topcoat is a urethane topcoat.

As used herein, the term "self-priming topcoat", also known as a "direct to substrate coating", refers to a mixture of a binder(s), which can be an organic or inorganic based polymer or blend of polymers, typically at least one pigment, can optionally contain at least one solvent or mixture of solvents, and can optionally contain at least one curing agent. A self-priming topcoat is typically applied directly to a substrate. The self-priming topcoat can optionally be applied to an organic or inorganic polymeric coating, such as a primer or paint film. A self-priming topcoat is typically the coating layer in a single or multi-layer coating system where the outer surface of the coating is exposed to the atmosphere or environment, and the inner surface of the coating is typically in contact with the substrate or optional polymer coating or primer.

As used herein, the term "enhanced self-priming topcoat", also referred to herein as an "enhanced direct to substrate coating" refers to a mixture of functionalized fluorinated binders, such as a fluoroethylene-alkyl vinyl ether in whole or in part with other binder(s), which can be an organic or inorganic based polymer or blend of polymers, typically at least one pigment, can optionally contain at least one solvent or mixture of solvents, and can optionally contain at least one curing agent. An enhanced self-priming topcoat is typically applied directly to a substrate. The enhanced self-priming topcoat can optionally be applied to an organic or inorganic polymeric coating, such as a primer or paint film. An enhanced self-priming topcoat is typically the coating layer in a single or multi-layer coating system where the outer surface of the coating is exposed to the atmosphere or environment, and the inner surface of the coating is typically in contact with the substrate or optional polymer coating or primer.

The topcoat, self-priming topcoat, and enhanced self-priming topcoat can be applied to a substrate, in either a wet or "not fully cured" condition that dries or cures over time, that is, solvent evaporates. The coatings can dry or cure either naturally or by accelerated means for example, an ultraviolet light cured system to form a film or "cured" paint. The coatings can also be applied in a semi or fully cured state, such as an adhesive.

As used herein, the terms "paint formulation", "primer formulation", "topcoat formulation", "self-priming topcoat formulation", and "enhanced self-priming topcoat formulation" refer to a list of ingredients, and/or components, and can also include a list of instructions for preparing and mixing together the ingredients, and/or components to make a coating composition.

As used herein, the terms "mill base", "mill base formulation", "primer mill base", "topcoat mill base" and "base", "base formulation", or "primer base", "topcoat base", "self-priming topcoat base", and "enhanced direct to substrate base" refer to a portion or component of a paint formulation that comprises the majority, if not all, of the pigmentation of the coating composition, as well as some additives.

Discussion

Embodiments of the invention provide compositions for primer coatings that allow for improved corrosion resistance of metal substrates. In one embodiment non-primer coatings are used. In one embodiment non-metal substrates are used. Moderate to low concentrations of rare earth compounds, alone or in combination with other materials or components, have been formulated into coating mixtures providing corrosion resistance. Additionally provided are extenders, including moderate to low concentrations of neutral to slightly acidic generating extenders and acidic generating extenders, also alone or in combination with other materials or components, which have been formulated into coating mixtures providing corrosion resistance.

In one embodiment, coatings containing rare earth compounds, neutral to slightly acidic generating extenders and/or acidic generating extenders in varying concentrations are provided to enhance the corrosion resistance properties of the resulting coating films. In one embodiment, the coatings are aqueous or solvent borne coating compositions applied as liquids, e.g., paint. In other embodiments, the coatings are applied in powder or paste (e.g., solgel) form. In yet other embodiments, the coating is a sealant, conducting polymer, or the like.

Rare earth compounds useful in the present invention include, but are not limited to either anhydrous or hydrated rare earth oxides, hydroxides, mixed oxides, solid solution oxides, hydrated oxides, salts, triflates, carbonates, and complexes, such as rare earth complexes using ethylenediamine tetraacetic acid, organic-based ionic exchange resins, etc., and the like. In one embodiment, one or more rare earth compounds are added to a coating composition. In a particular embodiment, the one or more rare earth compounds are added in a weight percent of between about 0.1 to about 90 wt % of the total amount of all pigments present in the coating. In most embodiments, the coating contains between about 0.1 to about 28 wt %, of a rare earth compound (i.e., compounds), although the invention is not so limited The rare earth compounds useful herein can be based on any of the lanthanide series. Preferred for the practice of the invention are praseodymium, cerium, and terbium. Particularly preferred are praseodymium and terbium, with the most currently preferred being praseodymium. The oxidation state of the rare earth metal employed is important. For example, in the case of praseodymium, in one embodiment, praseodymium(III) is used. In another embodiment, a praseodymium (III/IV) mixture is used. In yet another embodiment, praseodymium(IV) is used. The preferred oxidation states of the rare earth compounds can also be a function of the final coating system employed. In one embodiment, the rare earth compound is a praseodymium(III) sulfate. In another embodiment, the rare earth compound is a praseodymium(III/IV) oxide or a praseodymium(III/IV) solid solution. In other embodiments the rare earth compound can be a praseodymium mixed oxide, a praseodymium(III) oxide, a praseodymium(III) hydroxide, a praseodymium(IV) oxide, and any combinations thereof, further including combinations with any other praseodymium or other metals.

In one embodiment the rare earth compound can be a cerium oxide, cerium hydroxide, cerium solid solution mixed oxide, cerium oxide mixture, cerium salt, neodymium oxide, neodymium hydroxide, neodymium solid solution mixed oxide, neodymium oxide mixture, neodymium salt, praseodymium oxide, praseodymium hydroxide, praseodymium solid solution mixed oxide, praseodymium oxide mixture, praseodymium salt, ytterbium oxide, ytterbium hydroxide, ytterbium solid solution mixed oxide, ytterbium oxide mixture, ytterbium salt, yttrium oxide, yttrium hydroxide, yttrium solid solution mixed oxide, yttrium oxide mixture, yttrium salt, terbium oxide, terbium hydroxide, terbium solid solution mixed oxide, terbium oxide mixture, terbium salt, and combinations thereof.

Many rare earth compounds, alone or in combination with other materials, have been evaluated to date (See Examples). These compounds have been incorporated into commercially available primer formulations as corrosion inhibitors. Evaluation of these primer coatings containing the rare earth compounds alone or in combination with the other materials in neutral salt fog environments demonstrates that the presence of these corrosion inhibitors improves the overall corrosion resistance of the metal substrate, although it is likely any substrate, as defined herein, can benefit from application of such coatings. Similarly, it is expected that any type of coating can benefit from inclusion of rare earth compounds, alone or in combination with other components. Elemental characterization of these systems suggests leaching of the inhibitor passivates and protects the underlying metal substrate.

Extenders useful in the present invention include, but are not limited to, neutral to slightly acidic generating extenders and acidic generating extenders. In one embodiment, one or more neutral to slightly acidic generating extenders are used. Such extenders can be acidic, neutral or basic. Examples include, but are not limited to, sulfates, sulfonates, sulfides, sulfites, phosphates, phosphonates, phosphides, phosphates, nitrates, nitrites, nitrides, silicates and combinations thereof. In one embodiment, one or more acidic generating extenders are used. Such extenders can be acidic or neutral. Examples include, but are not limited to acid-modified compounds, such as acid-modified phosphates, phosphides, phosphates, kaolins, wallastonites, silicates and combinations thereof.

Also useful in the present invention are conventional extenders that can serve as a cost effective substitute for coloring pigments such as $TiO_2$ and can further provide the desired pigment to binder ratios for the primer coatings. One example of a conventional extender includes, but is not limited to, calcium carbonate. Many of these extenders appear to assist in the activation of inhibitors that can be present in the environment (e.g., in previously applied conversion coatings, in the polymeric coating itself, etc.), thus enhancing the corrosion resistance of the protective coating.

In one embodiment, the neutral to slightly acidic generating extenders or acidic generating extenders include Group I and II metal cations. In one embodiment, the neutral to slightly acidic generating extenders or acidic generating extenders include sulfates and phosphates of praseodymium (such as praseodymium(III), (IV) or (III/IV) mixtures), calcium, strontium, barium and magnesium, and the natural forms of these compounds such as gypsum and celestite. Preferably the neutral to slightly acidic generating extenders or acidic generating extenders include calcium, strontium, and barium sulfates and phosphates that do not substantially solubilize in the coating composition, although the invention is not so limited. In one embodiment, the neutral to slightly acidic generating extenders or acidic generating extenders are selected from the group that includes, but is not limited to, sulfates, including metal sulfates (e.g., anhydrous calcium sulfate, hydrated calcium sulfate, strontium sulfate, barium sulfate, hydrated magnesium sulfate, etc.), metal phosphates (e.g., hydrous calcium phosphate, anhydrous calcium phosphate and mono- and di-hydrogen calcium phosphate, etc.). Again, any of the extenders described herein can be used in either natural (mineral) or synthetic form. The acidic generating extenders can further include non-sulfate, non-phosphate and non-nitrate acidic generating extenders, such as the Burgess extenders including calcined clays, e.g., calcined kaolin clays, etc., made by the Burgess Pigment Co. having offices in Sandersville, Ga., and the like. However, other metal cations and anions having the aforementioned properties can be used as neutral to slightly acidic generating extenders and acidic generating extenders in the coating compositions of the present invention, as will be understood by those of skill in the art with reference to this disclosure.

In one embodiment, one or more neutral to slightly acidic generating extenders and/or one or more acidic generating extenders are used. The amount of extenders used can vary considerably, because some are more efficient in the particular system being used. In one embodiment, neutral to slightly acidic generating extenders and/or acidic generating extenders are added in a weight percent of between about 1 to about 99% of the total amount of all pigments in the coating. In most embodiments the coating contains between about 30 to about 80 wt % of one or more neutral to slightly acidic generating extenders and/or acidic generating extenders. In more preferred embodiments, the coating contains between about 45 to 75 wt % of one or more neutral to slightly acidic generating extenders and/or acidic generating extenders. In a particular embodiment, between about 0.1 to about 3 wt % of one or more types of magnesium sulfate is used.

Several neutral to slightly acidic generating extenders and acidic generating extenders have been evaluated to date, alone or in combination with other materials (See Examples). These compounds have been incorporated into commercially available primer formulations as corrosion inhibitors. Evaluation of these primer coatings containing these extenders alone or in combination with the other materials in neutral salt fog environments demonstrates that the presence of these corrosion inhibitors improves the overall corrosion resistance of the metal substrate, although it is likely any substrate, as defined herein, can benefit from application of such coatings. Similarly, it is expected that any type of coating can benefit from inclusion of neutral to slightly acidic generating extenders and/or acidic generating extenders, alone, or in combination with other components. Elemental characterization of these systems suggests leaching of the inhibitor passivates and protects the underlying metal substrate.

The "other materials or components" (i.e., "other components") with which the corrosion inhibitors described herein can be combined include, for example, binders, solvents, pigments (including soluble or non-soluble extenders, fillers, corrosion-inhibiting pigments, and the like), solvents, additives (e.g., curing agents, surfactants, dyes, amino acids and the like), and so forth. Note that some additives can also properly be considered a pigment and vice versa (e.g., matting agents). More specifically, these "other components" include, but are not limited to, glycine, arginine, methionine, and derivatives of amino acids, such as methionine sulfoxide, methyl sulfoxide, and iodides/iodates, gelatin and gelatin derivatives, such as animal and fish gelatins, linear and cyclic dextrins, including alpha and beta cyclodextrin, triflic acid, triflates, acetates, talc, kaolin, organic-based ionic exchange resins, such as organic-based cationic and anionic exchange resins, organic-based ionic exchange resins, such as organic-based cationic and anionic exchange resins, organic-based ionic exchange resins that have been pre-exchanged or reacted with the salts, oxides, and/or mixed oxides of rare earth material, and metal sulfates, such as sulfates of rare earth materials, magnesium sulfate, calcium sulfate (anhydrous and hydrated forms), strontium sulfate, barium sulfate, and the like.

Corrosion co-inhibitors known in the art can also optionally be employed in the present invention together with the rare earth compounds and/or neutral to slightly acidic generating extenders and/or acidic generating extenders, and, optionally, any of the other components described herein. Such co-inhibitors include, but are not limited to, borates, metaborates, aniline, polyaniline, and the like. Other co-inhibitors can also be optionally employed in the present invention, such as Nalzan™ (made by NL Industries having offices in Highstown, N.J.), Busan™ (made by Buckman Laboratories having offices in Memphis Tenn.), Halox™ (made by Halox Inc. having offices in Hammond, Ind.), Molywhite™ (made by Sherwin Williams Inc. having offices in Coffeyville, Kans.), and the like. It is appropriate to use only those co-inhibitors that are chemically compatible with the rare earth- or neutral to slightly acidic generating- or acidic generating extender-containing paint formulation.

The various corrosion inhibitors described herein are typically combined with a binder, such as an organic polymer. The organic polymers useful herein as binders include those soluble in water and those soluble in non-aqueous systems and powder coating systems. Polymers that are film-forming and that crosslink upon curing are preferred. Examples of these polymers include, but are not limited to, epoxy, urethane, urea, acrylate, alkyd, melamine, polyester, vinyl, vinyl ester, silicone, siloxane, silicate, sulfide, sulfone, epoxy novolac, epoxy phenolic, amides, drying oils, and hydrocarbon polymers.

All of the corrosion inhibitors (including co-inhibitors) discussed herein are preferably prepared in a liquid form. Thus, the binder, such as an organic polymer, is dispersed or dissolved in an appropriate solvent, such as water or a non-aqueous solvent depending on the nature of the polymer, and the appropriate amount of corrosion inhibitor(s) is added.

The corrosion inhibitors (including co-inhibitors) described above were evaluated in a polyamide/epoxy-based water reducible primer paint formulation, although the present invention is not limited to this specific epoxy-based system. As such, the corrosion inhibitors can be incorporated into other primer paint formulations and employed in other applications where corrosion prevention is desired. Other resins can include, but are not limited to, e-coats, epoxy, urethane, urea, acrylate, alkyd, melamine, polyester, vinyl, vinyl ester, silicone, siloxane, silicate, sulfide, sulfone, epoxy novilac, epoxy phenolic, amides, drying oils, and hydrocarbon polymers. The preferred polymer system is a water reducible epoxy-polyamide system. In a particular embodiment, the polyamide/epoxy-based water reducible primer paint formulation used is Deft 44GN72 manufactured by Deft Inc., having offices in Irvine, Calif.

Addition of about 0.1 to about 90 wt %, and preferably about 0.1 to about 28 wt %, of a rare earth compound into a primer formulation (or a paint ready to apply) can be by any conventional method known in the art. Similarly, addition of about 1 to about 99 wt % and preferably about 45 to about 75 wt % of a neutral to slightly acidic generating extender and/or an acidic generating extender into a primer formulation (or a paint ready to apply) can also be by any conventional method known in the art. The primer can also include about 0.1 to about 15 wt % and preferably about 0.5 to about 5 wt % of an organic-based ionic exchange resin. The resin can be either cationic or anionic in nature, both cationic and anionic can be used in the same primer formulation, and the ionic exchange resin can contain rare earth compounds and/or amino acids as pre-exchanged species prior to incorporation into a primer formulation. The primer can contain about 0.03 to about 5 wt %, and preferably about 0.1 to about 1.2 wt %, complexing sugars and/or gelatin. The primer can also contain about 0.1 to about 5 wt % and preferably about 0.5 to about 1.5 wt %, amino acids.

System enhancers can also be employed to enhance and optimize transport of the particular functional species being used and ultimately increase the concentration of the active inhibitor at the corrosion sites. Parameters that optimize transport include, but are not limited to, use of conversion coatings, particle size of the pigment, dust coat, and the like.

Conversion coatings useful herein include cerium conversion coatings (CeCC), praseodymium conversion coatings (PrCC), phosphate conversion coatings, zinc-type conversion coatings, anodized-type conversion coatings, and chromium conversion coatings (CrCC). The conversion coatings evaluated in conjunction with the present invention include CrCC, such as those obtained using the Alodine (from Henkel) and Iridite (from McDermid) processes, chromic acid anodized with chrome seal, sulfuric acid anodized with chrome seal, and the like. The age and thickness of the applied conversion coatings can further influence the corrosion resistance of the subsequent paint coatings. It is preferred to apply the paint coating over a conversion coating which is less than three days old and is relatively moderate to heavy in thickness, but yet still provides excellent adhesion to the underlying substrate. Conversion coatings that are too thick tend to result in primers with cohesive failure in the conversion coating layer. The proper conversion coating thickness will be readily apparent to one of ordinary skill in the art.

Additional additives and pigments can be employed to provide desired aesthetic or functional effects. If desired, the coating composition can contain other components, i.e., optional materials, well known in the art of formulated surface coatings. These optional materials would be chosen as a function of the coating system and application and can include flow control agents, thixotropic agents such as bentonite clay, fillers, anti-gassing agents, organic co-solvents, catalysts, and other customary auxiliaries. These materials, if used, can constitute up to 40 percent by weight of the total weight of the coating composition.

The coating composition of the present invention can also optionally contain pigments to give it color. In general, the pigment is incorporated into the coating composition in amounts of about 1 to about 80 percent, usually about 1 to about 30 percent by weight based on total weight of the coating composition. Color pigments conventionally used in surface coatings include inorganic pigments such as titanium dioxide, iron oxide, carbon black; phthalocyanine blue, and phthalocyanine green. Metallic flake pigmentation is also useful in aqueous coating compositions of the present invention. Suitable metallic pigments include aluminum flake, copper bronze flake, and metal oxide coated mica. The optional pigments can comprise up to approximately 25 weight percent of the coating composition.

The preferred concentration ranges of the components in the coating, as well as the PVC (pigment volume concentration) of the coating, can vary based on the resin/primer system employed. In concentration ranges provided, the weight percentages are based on a fully catalyzed and water reduced sprayable paint Preferred for the practice of the present invention is a coating comprising a PVC in the range of about 0.1 to about 65 wt % PVC. Particularly preferred is about 10 to about 55 wt % PVC. Most preferred is an about 25 to about 45 wt % PVC.

Preferred for the practice of one embodiment of the present invention is a fully catalyzed and water reduced sprayable paint composition comprising about 0.1 to about 40 wt % $Pr_6O_{11}$. Particularly preferred in this embodiment is about 0.1 to about 28 wt % $Pr_6O_{11}$. Most particularly preferred is about 0.1 to about 11 wt % $Pr_6O_{11}$. Other preferred ranges are as follows:

TABLE 1A***

Rare Earth Compounds

| | | |
|---|---|---|
| $Pr_6O_{11}$: | Range: 0.1-90% | Preferred: 0.4-28 wt % |
| $Pr_2O_3$: | Range: 0.1-90% | Preferred: 0.4-28 wt % |
| $PrO_2$: | Range: 0.1-90% | Preferred: 0.4-28 wt % |
| $PrO_2 + Pr_2O_3$: | Range: 0.1-90% | Preferred: 0.4-28 wt % |
| $Tb_4O_7$: | Range: 0.1-90% | Preferred: 0.4-28 wt % |
| $CeO_2$ Hydrous | Range: 0.1-90% | Preferred: 0.4-28 wt % |
| $Pr(OH)_3$: | Range: 0.1-90% | Preferred: 0.4-28 wt % |
| $Sm_2O_3$: | Range: 0.1-90% | Preferred: 0.4-28 wt % |
| $Yb_2O_3$: | Range: 0.1-90% | Preferred: 0.4-28 wt % |
| $Y_2O_3$: | Range: 0.1-90% | Preferred: 0.4-28 wt % |
| $La_2O_3$: | Range: 0.1-90% | Preferred: 0.4-28 wt % |
| $Nd_2O_3$: | Range: 0.1-90% | Preferred: 0.4-28 wt % |

***Ranges given as: "Range: x-x wt %" are understood to read as: "Range: between about x to about x wt %."

Preferred for the practice of one embodiment of the present invention is a paint composition comprising about 1 to about 99 wt % of a metal sulfate. Particularly preferred in this embodiment is about 30 to about 80 wt % of $CaSO_4.2H_2O$. Most particularly preferred is about 45 to about 75 wt % of $CaSO_4.2H_2O$. Other preferred ranges are as follows:

TABLE 1B***

Neutral to Slightly Acidic Generating Extenders and Acidic Generating Extenders

| | | |
|---|---|---|
| Metal Sulfates: | | |
| $CaSO_4.2H_2O$: | Range: 1-99 wt % | Preferred: 45-75 wt % |
| $SrSO_4$: | Range: 1-99 wt % | Preferred: 45-75 wt % |
| $CaSO_4$ Anhyd.: | Range: 1-99 wt % | Preferred: 45-75 wt % |
| $BaSO_4.2H_2O$: | Range: 1-99 wt % | Preferred: 45-75 wt % |
| $MgSO_4.7H_2O$: | Range: 1-3 wt % | Preferred: 1.5-2.5 wt % |
| $MgSO_4.2H_2O$: | Range: 0.1-3 wt % | Preferred: 1.5-2.5 wt % |
| Pr Sulfate: | Range: 0.1-3 wt % | Preferred: 0.5-2.5 wt % |
| $La_2(SO_4)_3 2H_2O$: | Range: 1-99 wt % | Preferred: 45 75 wt % |
| $Li_2SO_4.2H_2O$: | Range: 1-99 wt % | Preferred: 45 75 wt % |
| Metal Phosphates. | | |
| $Ca(H_2PO_4)_2.H_2O$: | Range: 1-99 wt % | Preferred: 45-75 wt % |
| $Ca(HPO_4)H_2O$: | Range: 1-99 wt % | Preferred: 45-75 wt % |
| $Ca_3(PO_4)_2.H_2O$: | Range: 1-99 wt % | Preferred: 45-75 wt % |
| Other Extender Types: | | |
| $CaCO_3.2H_2O$ | Range: 3-99 wt % | Preferred: 45-75 wt % |
| Kaolin | Range: 3-99 wt % | Preferred: 45-75 wt % |
| Sr Carbonate: | Range: 6-35% | Preferred: 16.1-18.8 wt % |
| Pr Carbonate: | Range: 6-35% | Preferred: 16.1-18.8 wt % |

***Ranges given as: "Range: x-x wt %"are understood to read as: "Range: between about x to about x wt %."

For the additional materials, the following wt % ranges are preferred:

TABLE 1C***

Other Materials

| | | |
|---|---|---|
| $La_2(SO_4)_3$: | Range: 1-99% | Preferred: 45-75 wt % |
| $Li_2SO_4$ | Range: 1-99% | Preferred: 45-75 wt % |
| L-Arginine: | Range: 0.1-5 wt % | Preferred: 0.5-1.5 wt % |
| D,L-Arginine: | Range: 0.1-5 wt % | Preferred: 0.5-1.5 wt % |
| D-Methionine: | Range: 0.1-5 wt % | Preferred: 0.5-1.5 wt % |
| L-Methionine: | Range: 0.1-5 wt % | Preferred: 0.5-1.5 wt % |
| D,L-Methionine: | Range: 0.1-5 wt % | Preferred: 0.5-1.5 wt % |
| Glycine: | Range: 0.1-5 wt % | Preferred: 0.5-1.5 wt % |
| L-Cystiene: | Range: 0.1-5 wt % | Preferred: 0.5-1.5 wt % |
| Cystene: | Range: 0.1-5 wt % | Preferred: 0.5-1.5 wt % |
| Proline: | Range: 0.1-5 wt % | Preferred: 0.5-1.5 wt % |
| Ethylenediaminetetra-acetic acid (Free): | Range: 0.1-5 wt % | Preferred: 0.5-l.5 wt % |
| Ethylenediaminetetra-acetic acid (Disodium salt): | Range: 0.1-5 wt % | Preferred: 0.5-1.5 wt % |
| D,L-Methionine Sulfoxide: | Range: 0.1-5 wt % | Preferred: 0.5-1.5 wt % |
| L-Methionine methylsulfonium iodide: | | |
| Animal Gelatin: | Range: 0.03-5 wt % | Preferred: 0.1-1.2 wt % |
| Proline of Fish Gelatin: | Range: 0.03-5 wt % | Preferred: 0.1-1.2 wt % |
| Alpha or Beta Cyclodextrins: | Range: 0.03-5 wt % | Preferred: 0.1-1.2 wt % |
| Sulfonated Cyclodextrins: | Range: 0.03-5 wt % | Preferred: 0.1-1.2 wt % |
| Triflic Acid: | Range: 0.1-0.5 wt % | Preferred: 0.1-1.2 wt % |
| Pr Triflate: | Range: 0.4-5 wt % | Preferred: 0.7-3 wt % |
| Ce Triflate: | Range: 0.4-5 wt % | Preferred: 0.7-3 wt % |
| Reilex (As is): | Range: 0.1-15 wt % | Preferred: 0.5-5 wt % |
| Whatman CM23 (as is): | Range: 0.1-15 wt % | Preferred: 0.5-5 wt % |
| Whatman CM23 Pre-Exchanged with Praseodymium Triflate: | Range: 0.1-15 wt % | Preferred: 0.5-5 wt % |
| Whatman CM23 Pre-Exchanged with Methionine | Range: 0.1-15 wt % | Preferred: 0.5-5 wt % |
| Whatman DE23 (As is): | Range: 0.1-15 wt % | Preferred: 0.5-5 wt % |
| Whatman P11 (As is): | Range: 0.1-15 wt % | Preferred: 0.5-5 wt % |

TABLE 1C***-continued

| | | |
|---|---|---|
| Whatman CM23 Pre-Exchanged with Praseodymium Salt such as a Nitrate Salt: | Range: 0.1-15 wt % | Preferred: 0.5-5 wt % |
| Whatman CM23 Pre-Exchanged with Cerium Salt such as a Nitrate Salt: | Range: 0.1-15 wt % | Preferred: 0.5-5 wt % |
| Whatman CM23 Pre-Exchanged with Sulfuric Acid: | Range: 0.1-15 wt % | Preferred: 0.5-5 wt % |
| Sm Acetate: | Range: 0.1-5 wt % | Preferred: 0.5-2.5 wt % |

***Ranges given as: "Range: x-x wt %" are understood to read as: "Range: between about x to about x wt %."

Any conventional method for manufacturing a paint or coating can be used in the present invention. Examples include the use of drill presses powered by compressed air or electricity, sand mills which use appropriate grinding media, and the like. The following is an example of how a primer containing any individual or combination of the above inhibitors can be produced:

The mill base for a polyamide/epoxy-based water reducible primer formulation can be prepared (and, in fact, was prepared for all of the Examples described herein) by dispersing one or more binders, one or more pigments, solvent if needed, and a curing agent. The base for a self-priming topcoat composition, or enhanced self-priming topcoat composition can also be prepared in the same manner (and, in fact was prepared in this manner for all of the Examples described herein). In this process, the base is dispersed in an appropriately sized container at 650 rpm using a dispersion blade, such as a standard dispersion blade and standard dispersing equipment or even a drill press, as is known in the art. Next, under agitation at an appropriate speed, such as about 600-700 rpm, coloring pigments, naturally occurring extenders, that is, minerals such as gypsum, and synthetic extenders, together with any other corrosion inhibitors are incorporated into the coating formulation. If an appropriate grinding media is desired, it can be added as needed. Next, once the material is properly added to the formulation, the base is allowed to disperse for a suitable time and speed, such as about five more minutes at 650 rpm. After this time, the dispersion speed can be increased as needed, such as to about 1600 to 1640 rpm until the desired mill base pigment grind is obtained.

During dispersion at the higher speed, the temperature of the mill base can be monitored and kept below the recommended temperatures for the ingredients and resin systems used. If it appears that the mill base temperature is close to exceeding the recommended temperatures for the stability of the ingredients or resins, the dispersion speed can be reduced appropriately. If necessary, the dispersion process can be halted momentarily to allow proper cooling.

As will be understood by those of skill in the art with reference to this disclosure, other steps, such as using cooling systems to minimize higher dispersion temperatures can additionally or alternatively be used. Also, as will be understood by those of skill in the art with reference to this disclosure, the solvent employed in the preparation of the coating system is chosen in such a manner as to facilitate the preparation of the coating mixture, to provide suitable application properties, and provide and environmentally acceptable paint.

Next, once the desired pigment particle size for the base grind is obtained, the dispersion process can be halted, and the base filtered, if desired, to remove any undesired material from the base, such as grinding media that can optionally have been used. Next, the balance of formula ingredients are then added in a "letdown phase", as it is known in the art, while the pigment base or mill base is mixed. An optional step is to allow the base or finished paint to set for at least twenty-four hours prior to use, which allows the resin to wet all of the pigments.

The shelf life of the polyamide/epoxy-based water reducible primer formulation or the self-priming topcoat composition, or the enhanced self-priming topcoat composition prior to use is generally dictated by the time specifications provided by the supplier of the resin system.

Next, the polyamide/epoxy-based water reducible primer formulation, self-priming topcoat composition, or the enhanced self-priming topcoat composition is prepared by stirring appropriate amounts of a catalyst or activator, such as an isocyanate catalyst, into the finished base described above. Examples of isocyanate catalysts for self-priming topcoat or enhanced self-priming topcoat formulations include an isocyanate solution known as Deft 97GY088CAT available from Deft Inc., having offices in Irvine, Calif. To ensure proper curing and cross-linking of the resulting paint film, the amount of isocyanate catalyst added to the finished paint base can vary depending on the particular components of the coating system, as will be understood by those of skill in the art with reference to this disclosure.

Next, for the self-priming topcoat composition, or the enhanced self-priming topcoat composition, once the finished base and catalyst have been mixed together, the coating is ready for application to a substrate. The substrate to be coated can be that of a fabricated article, such as aircraft, automobiles, trucks, and farm equipment, for example, further including the components and parts for these articles.

Next, for the polyamide/epoxy-based water reducible primer formulation, once the appropriate amounts of epoxy catalyst and mill base are well mixed together, the appropriate amount of water is then slowly mixed into the primer mill base/epoxy catalyst blend and testing can be performed. The purity and amount of water added depends on what is recommended by the supplier of the coating system based on the spray viscosity and final use of the coating. Since the paint formulation is a water reducible system, care needs to be taken when adding the aqueous component to the epoxy catalyst/mill base blend.

The medium employed in the preparation of the coating system of the present invention is typically chosen in such a manner as to facilitate the preparation of the coating mixture, and to provide suitable adhesion to the substrate. The preferred medium is water, which includes the preparation of water borne coatings. Other systems include solvent-based and powder coatings.

As noted above, once the mill base/epoxy blend and appropriate amount of water are mixed together, the primer is now ready for application to the substrate. Suitable substrates include metal substrates such as aluminum, aluminum alloys, cast aluminum, magnesium, magnesium alloys, titanium, zinc, galvanized zinc, zinc-coated steel, zinc alloys, zinc-iron alloys, zinc-aluminum alloys, steel, stainless steel, pickled steel, iron compounds, magnesium alloys, and the like. Preferred substrates for the practice of the present invention are aluminum and aluminum alloys. The substrate to be coated can be that of a fabricated article, as described above, further including the components and parts for these articles.

The coating mixtures of the invention can be applied to the surfaces of a metal substrate using any conventional technique, such as spraying, painting with a brush, painting with rollers, dipping, and the like, but they are most often applied by spraying. The usual spray techniques and equipment for air spraying and electrostatic spraying and either manual or automatic methods can be used. Preferred for the practice of the present invention is spray coating.

It is preferred that the surface, such as a metal surface, be prepared to receive the coating. This preparation includes the conventional method of first cleaning the surface to remove grease and other contaminants. Once the surface is free of surface contaminants, it can be treated to remove any oxide coating, and in certain instances to provide a conversion coating to which the corrosion-inhibiting mixture can more readily bond. In the event that the surface has a thick oxide coating, then this coating can be removed by conventional means, such as immersion in a series of sequential chemical baths containing concentrated acids and alkalis that remove such a surface coating.

In most embodiments, the substrate or coated substrate is prepared prior to receiving the coating, i.e., is pretreated. This preparation includes the conventional method of first cleaning the surface to remove grease and other contaminants. Once the surface is free of surface contaminants, it can be treated to remove any oxide coating by conventional means, such as by immersing the substrate in a series of sequential chemical baths containing concentrated acids and alkalis known to remove such a surface coating. As noted above, in some embodiments, the substrate is treated to provide a conversion coating to which the coating can more readily bond. Such a conversion coating can be prepared by any means known in the art, such as by immersion in concentrated chromic acid. When an aluminum substrate is used, for example, this process produces a controlled mixture of aluminum oxides on the surface of an aluminum or aluminum alloy substrate. Alternatively, the surface can be treated with a boric acid/sulfuric acid or any other anodizing process. This process produces a controlled mixture of aluminum oxides in the surface of an aluminum or aluminum alloy substrate. Optionally, after the surface has been treated to provide a conversion coating, the surface can be sealed by dipping the substrate into a dilute solution of chromic acid. The surface, whether sealed or unsealed, can then be coated with the coatings described herein.

In one embodiment, the coating is applied to an aluminum anodized substrate to create an aluminum anodized system with and without sealing in a chrome containing solution. In one embodiment, the coating is applied to an aluminum anodized substrate to create an aluminum anodized system with and without sealing in a rare earth solution. In one embodiment, the coating is applied to a steel substrate with and without sealing in the appropriate solution.

The coatings described herein can be applied to a substrate using any conventional technique, such as spraying, "painting" (e.g., with a brush, roller, and the like), dipping, and so forth. With regard to application via spraying, conventional (automatic or manual) spray techniques and equipment used for air spraying and electrostatic spraying can be used. In other embodiments, the coating is an electrolytic coating (e-coating) system, electrostatic (powder) coating, and the like. Various types of curing methods are described below.

The coatings described herein can be any suitable thickness, depending on the application requirements. In one embodiment, the coating is between about 1 to about 3 mils thick. In another embodiment, the coating is between about 0.8 to about 1.2 mils thick.

Typically, after application of the coating, the coating is cured using any suitable method. Typical curing methods include air drying, and/or heating and/or UV-curing methods. Other methods include, but are not limited to, microwave cured systems, ultrasonic cured systems, and the like. The method of curing will depend on the type of coating mixture employed, the surface to which it is applied, and so forth.

Once the coating is applied and cured, it can either receive subsequent topcoats, or be cured as a stand-alone coating. If the coating is to receive a subsequent topcoat, or several subsequent coatings, then the subsequent coating should be applied so as to be compatible with the coating layer already present, typically in accordance with the resin and/or topcoat manufacturers' specifications. If the coating does not receive any subsequent topcoats, it can then be allowed to cure.

Additional Embodiments

In one embodiment, the coating composition is a self-priming topcoat composition, or an enhanced self-priming topcoat composition. These coating compositions can be used on metals such as aluminum, aluminum alloys, cast aluminum, magnesium, magnesium alloys, titanium, zinc, zinc-coated steel, zinc alloys, zinc-iron alloys, zinc-aluminum alloys, bare and galvanized steel, stainless steel, pickled steel, iron compounds, magnesium alloys, substrates having metal pretreatments, such as chrome-based conversion coatings, anodized coatings, cobalt-based conversion coatings, phosphate-based conversion coatings, silica-based conversion coatings, rare earth-based conversion coatings, and stainless metal pretreatments for example, and polymers, polymer/metal composites, composites, coated substrates, and the like. In a preferred but not required embodiment, the self-priming topcoat composition, or the enhanced self-priming topcoat composition is applied over a conversion coating that is less than three days old. Applying the self-priming topcoat composition, or the enhanced self-priming topcoat composition over a conversion coating has been found to maintain good adhesion of the coating to the substrate. It has also been found that conversion coatings that are too thick for a given application can result in cohesive failure in the conversion coating layer. As will be understood by those of skill in the art with reference to this disclosure, the proper conversion coating performance and thickness, for a particular coating composition, will be apparent and preferred coatings comply with MIL-C-5541.

In another embodiment, a process for preparing and using the self-priming topcoat composition, or the enhanced self-priming topcoat composition is provided. According to this embodiment, conventional methods for manufacturing a paint can be used. As will be understood by those of skill in the art with reference to this disclosure, examples of such methods include, but are not limited to, the use of drill presses powered by compressed air or electricity, sand mills that use appropriate grinding media, and the like.

The invention will be further described by reference to the following non-limiting examples, which are offered to further illustrate various embodiments of the present invention. It should be understood, however, that many variations and modifications can be made while remaining within the scope of the present invention.

EXAMPLE 1

Exemplary Mill Base Formulations

Group IIA pigments have been tested for corrosion resistance, including sulfates (e.g., anhydrous calcium sulfate, hydrated calcium sulfate, strontium sulfate, barium sulfate), metal phosphates (e.g., hydrous calcium phosphate, anhydrous calcium phosphate and mono- and di-hydrogen calcium phosphate, etc.), alone and in combination with other components. Two examples of the composition, concentrations, material ratios, vendor materials or vendor supplier, of a polyamide/epoxy water reducible primer mill base formulation containing these types of compounds is shown below. Other formulations were also tested:

Component:

| Polyamide Resin Blend | 417 g |
|---|---|
| Dispersing Agent | 6 g |
| 2-Butanol Solvent | 87 g |
| Extender/Filler Pigment | 490 g |
| Mill Base Total: | 1000 g |

Component:

| Polyamide Resin Blend | 320 g |
|---|---|
| Additive | 5 g |
| 2-Butanol Solvent | 67 g |
| $TiO_2$(R-960) | 134 g |
| Co-Inhibitor(s) | 100 g |
| Extender/Filler Pigment | 374 g |
| Mill Base Total: | 1000 g |

The concentration of the corrosion inhibitors used as individuals range from about 0.1 wt % to about 90 wt %.

Additional Information and Procedures Used

The wt % of inhibitor is based on a fully catalyzed and water reduced primer and the spray viscosity is equal to about 22 seconds on a standard EZ Zhan 2 Cup.

The polyamide/epoxy water reducible primer mill base was then well mixed with appropriate amounts of the epoxy catalyst blend as described above and recommended by the supplier of the resin. One example of an epoxy catalyst/activator would consist of a solvent, an additive, and a resin blend, such as Deft's epoxy/nitroethane solution, manufacturer's code number 44WO16CAT.

Once the appropriate amounts of epoxy catalyst and mill base were well mixed together, the appropriate amount of water was then slowly mixed into the primer mill base/epoxy catalyst blend. The purity and amount of the water added depends on what is recommended by the supplier of the coating system based as described above. Procedures for mixing of the primer, shelf life of primer mill base, spray life of catalyzed and water reduced primer, and the like, are in accordance with the specifications of the supplier of the resin material.

Examples of such primer formulations that have been prepared and evaluated are provided in Table 3 below.

EXAMPLE 2

Primer Mill Base Formulation

Oxides, either anhydrous or hydrated, and hydroxides of rare earth elements have been evaluated as being non-toxic alternatives to chromates. Rare earth oxides, either anhydrous or hydrated, and hydroxides, such as Cerium (IV) Oxide, Cerium (IV) Oxide dihydrate, Praseodymium (III) Oxide, and the like, have been incorporated into polyamide/epoxy water reducible primer formulations. One example of a polyamide/epoxy water reducible primer mill base formulation containing rare earth salts is as follows:

| Polyamide Resin Blend | 341 g |
|---|---|
| Additive | 5 g |
| 2-Butanol Solvent | 71 g |
| $TiO_2$(R-960) | 143 g |
| Rare Earth Oxide(s) | 40 g |
| Extender/Filler Pigment | 400 g |
| Mill Base Total: | 1000 g |

The concentration of the corrosion inhibitors used as individuals range from about 0.4 wt % ($Pr_2O_3$ panel A151) to about 12 wt % ($CeO_2 \cdot xH_2O$). Additional procedures used in this Example were as described in Example 1 under "Additional Information and Procedures Used." See Table 3 in Example 12 for test results.

EXAMPLE 3

Mixed oxides, either anhydrous or hydrated, and hydroxides of mixed oxides of rare earth elements have been evaluated as being non-toxic alternatives to chromates. Rare earth mixed oxides, either anhydrous or hydrated, and hydroxides, such as Terbium (III/IV) Oxide, Praseodymium (III/IV) Oxide, and the like, have been incorporated, individually and in combination, into polyamide/epoxy water reducible primer formulations. One example of a polyimide/epoxy water reducible primer mill base formulation containing rare earth salts is as follows:

Primer Mill Base Formulation

| Polyamide Resin Blend | 328 g |
|---|---|
| Dispersing Agent | 5 g |
| 2-Butanol Solvent | 68 g |
| $TiO_2$ | 137 g |
| Rare Earth Mixed Oxide(s) (Anhy./Hydrous./Hydroxide) | 77 g |
| Extender/Filler Pigment | 385 a |
| Mill Base Total: | 1000 g |

The concentration of the corrosion inhibitors used as individuals range from about 1 wt % ($Pr_6O_{11}$, panel A22) to about 22.2 wt % ($Pr_6O_{11}$ panel 227). Additional procedures used in this Example were as described in Example 1 under "Additional Information and Procedures Used." See Table 3 in Example 12 for test results.

EXAMPLE 4

Amine-based aliphatic, aromatic, cyclic, and or sulfur containing compounds have been evaluated as being non-toxic alternatives to chromates. Amine-based aliphatic, aromatic, cyclic, and or sulfur containing compounds, for example amino acids, such as L-arginine, D,L-arginine, D-methionine, L-methionine, D,L-methionine, glycine, proline, L-cysteine, etc., and other amine-based compounds, such as ethylenediaminetetra-acetic acid (EDTA), di-sodium salts of EDTA, and the like, have been incorporated into polyimide/epoxy water reducible primer formulations. One example of a polyamide/epoxy water reducible primer mill base formulation containing these types of compounds is as follows:

Primer Mill Base Formulation

| | |
|---|---|
| Polyamide Resin Blend | 351 g |
| Dispersing Agent | 5 g |
| 2-Butanol Solvent | 73 g |
| TiO$_2$ | 146 g |
| Amine-based aliphatic, aromatic, cyclic, and/or sulfur containing compound(s) | 14 g |
| Extender/Filler Pigment | 411 g |
| Mill Base Total: | 1000 g |

The concentration of the amino acids used range from about 0.5 wt % (D,L-Methionine panel 0214) to about 1.5 wt % (D,L-Methionine panel 232). Additional procedures used in this Example were as described in Example 1 under "Additional Information and Procedures Used." See Table 3 in Example 12 for test results.

EXAMPLE 5

Derivatives of amine-based aliphatic, aromatic, cyclic, and or sulfur containing compounds have been evaluated and verified as being non-toxic alternatives to chromates. Derivatives of amine-based aliphatic, aromatic, cyclic, and or sulfur containing compounds, such as D,L-methionine sulfoxide, L-methionine methylsulfonium iodide, and the like, have been incorporated into polyamide/epoxy water reducible primer formulations. One example of this composition, concentrations, material ratios, vendor materials, or vendor supplier, of a polyamide/epoxy water reducible primer mill base formulation containing these types of compounds is as follows:

Primer Mill Base Formulation

| | |
|---|---|
| Polyamide Resin Blend | 351 g |
| Dispersing Agent | 5 g |
| 2-Butanol Solvent | 73 g |
| TiO$_2$ | 146 g |
| Derivative(s) of amine-based aliphatic, aromatic, cyclic, and/or sulfur and/or iodide containing compound(s) | 14 g |
| Extender/Filler Pigment | 411 g |
| Mill Base Total: | 1000 g |

The concentration of the corrosion inhibitors used as individuals range from about 0.5 wt % (D,L-methionine sulfoxide panel 0179) to about 1.1 wt % (D,L-Methionine Sulfoxide panel 234). Additional procedures used in this Example were as described in Example 1 under "Additional Information and Procedures Used." See Table 3 in Example 12 for test results.

EXAMPLE 6

Gelatin and gelatin derivatives have been evaluated as being non-toxic alternatives to chromates. Gelatin and gelatin derivatives, such as but not limited to animal gelatins and derivatives, fish gelatins and derivatives, and the like, have been incorporated into polyamide/epoxy water reducible primer formulations. One example of a composition, concentrations, material ratios, vender materials, or vender supplier, of a polyamide/epoxy water reducible primer mill base formulation containing these types of compounds is as follows:

Primer Mill Base Formulation

| | |
|---|---|
| Polyamide Resin Blend | 351 g |
| Dispersing Agent | 5 g |
| 2-Butanol Solvent | 73 g |
| TiO$_2$ | 146 g |
| Gelatin(s) and or Gelatin Derivative(s) | 14 g |
| Extender/Filler Pigment | 411 g |
| Mill Base Total: | 1000 g |

The concentration of the corrosion inhibitors used as individuals range from about 0.03 wt % (Animal Gelatin+Pr$_6$O$_{11}$+Ce(NO$_3$)$_3$ panel A66E) to about 1 wt % (Animal Gelatin+Pr$_6$O$_{11}$+Ce(NO$_3$)$_3$ panel A28). Additional procedures used in this Example were as described in Example 1 under "Additional Information and Procedures Used." See Table 3 in Example 12 for test results.

EXAMPLE 7

Chirally Active Dextrins have been evaluated as being non-toxic alternatives to chromates. Chirally Active Dextrins, such as alpha cyclodextrin, beta cyclodextrin, sulfonated cyclodextrins, and the like, have been incorporated into polyamide/epoxy water reducible primer formulations. One example of a polyamide/epoxy water reducible primer mill base formulation containing these types of compounds is as follows:

Primer Mill Base Formulation

| | |
|---|---|
| Polyamide Resin Blend | 351 g |
| Dispersing Agent | 5 g |
| 2-Butanol Solvent | 73 g |
| TiO$_2$ | 146 g |
| Chirally Active Dextrin(s) | 14 g |
| Extender/Filler Pigment | 411 g |
| Mill Base Total: | 1000 g |

The concentration of the corrosion inhibitors used was primarily at about 1.5 wt % (Cyclodextrin+Ce(NO$_3$)$_3$+

Pr$_6$O$_{11}$ panel C41. Additional procedures used in this Example were as described in Example 1 under "Additional Information and Procedures Used." See Table 3 in Example 12 for test results.

EXAMPLE 8

Organic-based ionic exchange resins have been evaluated as being non-toxic alternatives to chromates. Organic-based ionic exchange resins; such as organic-based cationic resins, for example Whatman fibrous cellulose phosphate cation exchanger P11, Whatman fibrous carboxymethyl cellulose cation exchanger CM23, and the like, and anionic exchange resins, for example Whatman fibrous diethylaminoethyl cellulose anion exchanger DE23, and Reilex 402 Polymer, and the like, have been incorporated into polyamide/epoxy water reducible primer formulations. One example of a polyamide/epoxy water reducible primer mill base formulation containing rare earth salts is as follows:

Primer Mill Base Formulation

| | |
|---|---|
| Polyamide Resin Blend | 351 g |
| Dispersing Agent | 5 g |
| 2-Butanol Solvent | 73 g |
| TiO$_2$ (R-960) | 146 g |
| Organic-Based Ionic Exchange Resin(s) | 14 g |
| Extender/Filler Pigment | 411 g |
| Mill Base Total: | 1000 g |

The concentration of the corrosion inhibitors used as individuals range from about 0.5 wt % (CM23+Pr$_6$O$_{11}$ panel 1216) to about 1 wt % (DE 23, panel 110). Additional procedures used in this Example were as described in Example 1 under "Additional Information and Procedures Used." See Table 3 in Example 12 for test results.

EXAMPLE 9

Organic-based, pre-exchanged ionic exchange resins have been evaluated as being non-toxic alternatives to chromates. Organic-based cationic and or anionic ionic exchange resins that have been pre-exchanged with rare earth cations and or amino acids; for example Whatman fibrous cellulose phosphate cation exchanger P11 pre-exchanged with a solution containing salts, oxides and mixed oxides, and or compounds or rare earths, Whatman fibrous cellulose phosphate cation exchanger P11 pre-exchanged with a solution containing amine-based aliphatic, aromatic, cyclic, and or sulfur and or iodide containing compounds and or derivatives of any of the above, etc. have been incorporated into polyamide/epoxy water reducible primer formulations. One example of a polyamide/epoxy water reducible primer mill base formulation containing these types of compounds is as follows:

Primer Mill Base Formulation

| | |
|---|---|
| Polyamide Resin Blend | 351 g |
| Dispersing Agent | 5 g |
| 2-Butanol Solvent | 73 g |
| TiO$_2$ | 146 g |

| | |
|---|---|
| Pre-Exchanged Organic-Based Ionic Exchange Resin(s) | 14 g |
| Extender/Filler Pigment | 411 g |
| Mill Base Total: | 1000 g |

The concentration of the corrosion inhibitors used range from about 0.5 wt % (P11+Pr(NO$_3$)$_3$, panel 1162) to about 2.5 wt % (P11+D,L-Methionine panel 15). Additional procedures used in this Example were as described in Example 1 under "Additional Information and Procedures Used." See Table 3 in Example 12 for test results.

EXAMPLE 10

Metal sulfates have been evaluated as being nontoxic alternatives to chromates. Metal sulfates, such as praseodymium sulfate or other rare earth sulfates, magnesium sulfate, calcium sulfate, strontium sulfate, and the like, have been incorporated into polyamide/epoxy water reducible primer formulations. One example of the composition, concentrations, material ratios, vendor materials, or vendor supplier, of a polyamide/epoxy water reducible primer mill base formulation containing these types of compounds is as follows:

Primer Mill Base Formulation

| | |
|---|---|
| Polyamide Resin Blend | 351 g |
| Dispersing Agent | 5 g |
| 2-Butanol Solvent | 73 g |
| TiO$_2$ | 146 g |
| Metal Sulfate(s) | 14 g |
| Extender/Filler Pigment | 411 g |
| Mill Base Total: | 1000 g |

The concentration of the corrosion inhibitors used as individuals range from about 1.4 wt % (Pr$_2$(SO$_4$)$_3$ panel A220) to about 18.5 wt % (SrSO$_4$, panel 267). Additional procedures used in this Example were as described in Example 1 under "Additional Information and Procedures Used." See Table 3 in Example 12 for test results.

EXAMPLE 11

Combinations of all of the above have been evaluated as being non-toxic alternatives to chromates. Combinations of all of the above, such as L-arginine+praseodymium(III/IV) oxide+calcium sulfate dihydrate, praseodymium sulfate+calcium sulfate+arginine, praseodymium(III/IV) oxide+calcium sulfate+methionine, praseodymium(III) oxide+praseodymium pre-exchanged cationic exchange resin P11+praseodymium(III/IV)oxide, etc., have been incorporated into polyamide/epoxy water reducible primer formulations. One example of a polyamide/epoxy water reducible primer mill base formulation containing rare earth salts is as follows:

Primer Mill Base Formulation

| | |
|---|---|
| Polyamide Resin Blend | 336 g |
| Dispersing Agent | 5 g |

-continued

| | | |
|---|---|---|
| 2-Butanol Solvent | 71 g | |
| $TiO_2$ | 140 g | |
| Pre-Exchanged Organic-Base Ionic Exchange Resin | 14 g | |
| $Pr_6O_{11}$ | 40 g | |
| Extender/Filler Pigment | 394 g | |
| Mill Base Total: | 1000 g | |

The concentration of the corrosion inhibitors used as combinations range from about 0.1 wt % ($Ce(NO_3)_3$+Free EDTA, panel D36) to about 30.6 wt % ($Ce(NO_3)_3$+$Na_2$EDTA+$Pr_6O_{11}$+$CaSO_4.2H_2O$ panel A38). Additional procedures used in this Example were as described in Example 1 under "Additional Information and Procedures Used." See Table 3 in Example 12 for test results.

EXAMPLE 12

Test Results on Exemplary Coatings

Many of the formulations noted in the previous examples were tested on various substrates for corrosion resistance. The Corrosion Rating Scale used is shown in Table 2. Examples of primer formulations that were prepared and evaluated are provided in Table 3.

Starting Materials

The Deft SrCr Primer (44GN072) was obtained from Deft Inc. having offices in Irvine, Calif. As noted above, the Raven materials, as well as the Ultra II materials, were obtained from Columbian Chemicals Company having offices in Marietta, Ga. The LHD, U47 and PLD materials were obtained from Sun Chemical having offices in Cincinnati, Ohio. $Pr_6O_{11}$ was obtained from Alfa Aesar Co. having offices in Ward Hill, Mass. Conductive carbon, non-conductive carbon, and activated carbon were obtained from Alpha Aesar having offices in Ward Hill, Mass. $CaSO_4$ $2H_2O$ was obtained from US Gypsum from Chicago, Ill. $SrSO_4$ was obtained from Excalibar of Huston, Tex.

Test Procedure

The coating was sprayed onto different metal substrates and allowed to dry (cure) naturally over time. Typically this took about one week. Edges and backs of samples were taped and front surfaces were scribed with an "X" pattern according to ASTM B117 procedure. Tests were run according to ASTM B117 procedure for either 500 or 3000 hours and the results evaluated according to the Keller Corrosion Rating Scale shown in Table 2.

Primer Panel Summary

TABLE 2

Corrosion Codes/Rankings Employed in Table 3

Code  Scribe line ratings description

1. Scribe line beginning to darken or shiny scribe
2. Scribe lines > 50% darkened
3. Scribe line dark
4. Several localized sites of white salt in scribe lines
5. Many localized sites of white salt in scribe lines
6. White salt filling scribe lines
7. Dark corrosion sites in scribe lines
8. Few blisters under primer along scribe line (<12)
9. Many blisters under primer along scribe line
10. Slight lift along scribe lines.
11. Coating curling up along scribe.

TABLE 2-continued

Corrosion Codes/Rankings Employed in Table 3

12. Pin point sites/pits of corrosion on organic coating surface (1/16 to 1/8 in diameter - about 0.16 cm (0.06 in) to about 0.32 cm (0.13 in)
13. One or more blisters on surface away from scribe
14. Many blisters under primer away from scribe
15. Starting to blister over surface Scribe Line Activity (corrosion creepage beyond scribe)

A. No creepage
B. 0 to 1/64 in - about 0 cm (in) to about 0.04 cm (0.02 in)
C. 1/64 to 1/32 in - about 0.04 cm (0.02 in) to about 0.08 cm (0.03 in)
D. 1/32 to 1/16 in - about 0.08 cm (0.03 in) to about 0.16 cm (0.06 in)
E. 1/16 to 1/8 in - about 0.16 cm (0.06 in) to about 0.32 cm (0.13 in)
F. 3/16 to 1/4 in - about 0.2 cm (0.48 in) to about 0.5 cm (0.25 in)
G. 1/4 to 3/8 in - about 0.6 cm (0.25 in) to about 0.95 cm (0.38 in)

TABLE 3

Panels Prepared and Evaluated

| Panel Number | Corrosion Inhibitor | Weight Percent Inhibitor Conc. | Extender/ Transport Enhancer | 2000 HRS Salt Fog Rating |
|---|---|---|---|---|
| 10 | $SrCrO_4$ | — | — | 1 A |
| D1 | $Ce(NO_3)_3$ | 0.15 | Kaolin | 3,6 A |
| D12 | $Ce(NO_3)_3$ | 5 | Kaolin | 3,6 A |
| D3 | $Ce(NO_3)_3$ | 3 | $CaSO_4$ (anhy.) | 3,6 A |
| D40 | $Ce(NO_3)_3$ | 0.4 | $CaSO_4$ (anhy.) | 3,6 A |
| D13 | $Ce(NO_3)_3$ | 5 | $CaSO_4$ (anhy.) | 3,6 A |
| D42 | $Ce(NO_3)_3$ | 0.4 | $CaSO_4 \cdot 2H_2O$ | 3,5 A |
| D140 | $Ce(NO_3)_3$ | .05 | $CaSO_4 \cdot 2H_2O$ | 3,5 A |
| D49 | $Ce(NO_3)_3$ | 5 | $CaSO_4 \cdot 2H_2O$ | 3,6 A |
| D73 | $Ce(NO_3)_3$ $H_3(CF_3SO_3)_3$ | .75/0.5 | $CaSO_4 \cdot 2H_2O$ | 3,6 A |
| D44 | $Ce(NO_3)_3$ | 0.5 | Deft (Mistron 600) | 3,6 A |
| D14 | $Ce(NO_3)_3$/ $BaB_2O_4$ | 8/8 | Kaolin | 3,6 A |
| Gen I | $CeO_2 \cdot 2H_2O$ | 32 | Mistron 600 | 3,6 A |
| D11 | $Ce(NO_3)_3$/ $CePO_4$ | 0.3/0.3 | Kaolin | 3,6 A |
| D15 | $Ce(NO_3)_3$/ $Pr(NO_3)_3$/ $BaB_2O_4$ | 1/1/1 | Kaolin | 3,5 A |
| D16 | $Ce(NO_3)_3$/ $Pr(NO_3)_3$/ $BaB_2O_4$ | 0.4 | $CaSO_4 \cdot 2H_2O$ | 3,5 A |
| D17 | $Ce(NO_3)_3$/ $Pr(NO_3)_3$/ $BaB_2O_4$ | 0.4/0.4/0.4 | Nicron 604 | 3,6 A |
| D18 | — | 0.0 | $CaSO_4 \cdot 2H_2O$ | 3,5 A |
| D19 | — | 0.0 | Nicron 604 | 3,6 A |
| C1 | $Na_2$EDTA | 0.9 | $CaSO_4 \cdot 2H_2O$ | 3,5 A |
| D50 | $Ce(NO_3)_3$ + Acid | 1.5 | $CaSO_4 \cdot 2H_2O$ | 3,4 A |
| D51 | $Ce(NO_3)_3$ + Base | 1.5 | $CaSO_4 \cdot 2H_2O$ | 3,4 A |
| D53 | $Ce(NO_3)_3$ + Base | 1.5 | $CaSO_4 \cdot 2H_2O$ | 3,4 A |
| D54 | $Ce(NO_3)_3$ + Acid + $H_2O_2$ | 1.5 | $CaSO_4 \cdot 2H_2O$ | 3,4 A |
| D55 | $Ce(NO_3)_3$ + Base + $H_2O_2$ | 1.5 | $CaSO_4 \cdot 2H_2O$ | 3,4 A |
| D56 | $Ce(NO_3)_3$ + Base + $H_2O_2$ | 1.5 | $CaSO_4 \cdot 2H_2O$ | 3,4 A |
| A1 | $PrCl_3$ | 3 | Kaolin | 3,6 A |
| A2 | $Pr(NO_3)_3$ | 3 | Kaolin | 3,6 A |
| A5 | $Pr(NO_3)_3$ | 1 | Kaolin | 3,6 A |
| A4 | $Pr(NO_3)_3$ | 8 | Kaolin | 3,6 A |
| A11 | $Pr(NO_3)_3$/ $BaB_2O_4$ | 3/3 | Kaolin | 3,6 A |
| A3 | $Pr(NO_3)_3$ | 3 | $CaSO_4$ (anhy.) | 3,5 A |
| A8 | $Pr(NO_3)_3$ | 1 | $CaSO_4$ (anhy.) | 3,5 A |
| A9 | $Pr(NO_3)_3$ | 5 | $CaSO_4$ (anhy.) | 3,5 A |
| A12 | $Pr(NO_3)_3$ | 0.5 | $CaSO_4 \cdot 2H_2O$ | 3,5 A |

TABLE 3-continued

Panels Prepared and Evaluated

| Panel Number | Corrosion Inhibitor | Weight Percent Inhibitor Conc. | Extender/ Transport Enhancer | 2000 HRS Salt Fog Rating |
|---|---|---|---|---|
| A26 | $Pr(NO_3)_3/Pr_6O_{11}$ | 1.5/1.5 | $CaSO_4 \cdot 2H_2O$ | 3,4 A |
| A33 | $Pr(NO_3)_3/Pr_6O_{11}$ | 2/3.1 | $CaSO_4 \cdot 2H_2O$ | 3,4 A |
| A46 | $Pr(NO_3)_3/Ce(NO_3)_3$ | 0.7/1 | $CaSO_4 \cdot 2H_2O$ | 3,4 A |
| A19 | $PrCO_3$ | 1 | $CaSO_4 \cdot 2H_2O$ | 3,5 A |
| A21 | $PrCO_3$ | 3 | Nicron 604 | 3,6 A |
| A63 | $Pr(NO_3)_3$ + Acid | 1.5 | $CaSO_4 \cdot 2H_2O$ | 3,5 A |
| A64 | $Pr(NO_3)_3$ + Base | 1.5 | $CaSO_4 \cdot 2H_2O$ | 3,4 A |
| A65 | $Pr(NO_3)_3$ + Base | 1.5 | $CaSO_4 \cdot 2H_2O$ | 3,4 A |
| A28 | $Ce(NO_3)_3/Pr_6O_{11}/$ Gelatin | 3.1/1/1 | $CaSO_4 \cdot 2H_2O$ | 3,4 A |
| A66E | $Ce(NO_3)_3/Pr_6O_{11}/$ Gelatin | 1.5/1.5/0.03 | $CaSO_4 \cdot 2H_2O$ | 1,4 A |
| A31 | $Ce(NO_3)_3/Pr(NO_3)_3/$Gelatin | 1/0.7/0.2 | $CaSO_4 \cdot 2H_2O$ | 2,4 A |
| D28 | $Ce(NO_3)_3$/Gelatin | 3/0.2 | $CaSO_4 \cdot 2H_2O$ | 2,4 A |
| A38 | $Ce(NO_3)_3/$ $Na_2EDTA/Pr_6O_{11}$ | 1/16/3.1 | $CaSO_4 \cdot 2H_2O$ | 2,4 A |
| C13 | $Ce(NO_3)_3/$ $Na_2EDTA/Pr_6O_{11}$ | 0.5/16/1 | $CaSO_4 \cdot 2H_2O$ | 2,4 A |
| C14 | $Ce(NO_3)_3/$ $Na_2EDTA/$ $Pr_6O_{11}/AlPO_4$ | 0.5/16/1/3 | $CaSO_4 \cdot 2H_2O$ | 2,4 A |
| A37 | $Ce(NO_3)_3/Pr_6O_{11}$ | 1/3.1 | $CaSO_4 \cdot 2H_2O$ | 2,4 A |
| A47 | $Ce(NO_3)_3/Pr_6O_{11}$ | 1.4/0.7 | $CaSO_4 \cdot 2H_2O$ | 2,4 A |
| C18 | $Ce(NO_3)_3/$ $Na_2EDTA/Pr_6O_{11}$ | 0.5/16/1 | $CaSO_4$ (anhy.) | 3,4 A |
| C19 | $Ce(NO_3)_3/$ $Na_2EDTA/$ $Pr_6O_{11}/AlPO_4$ | 0.5/16/1/3 | $CaSO_4$ (anhy.) | 3,4 A |
| A48 | $Ce(NO_3)_3/Pr_6O_{11}$ | 1.4/0.7 | $CaSO_4$ (anhy.) | 3,4 A |
| NH1 | $Nd(NO_3)_3$ | 3 | Kaolin | 3,6 A |
| NH2 | $Sm(C_2H_3O_2)_3$ | 3 | Kaolin | 3,6 A |
| K1 | K-White (Commercial) | 1 | $CaSO_4 \cdot 2H_2O$ | 3,6 A |
| K2 | K-White (Commercial) | 3 | $CaSO_4 \cdot 2H_2O$ | 2,4 A |
| C1 | $Na_2EDTA$ | 0.9 | $CaSO_4 \cdot 2H_2O$ | 3,6 A |
| C2 | $Na_2EDTA$ | 1.8 | $CaSO_4 \cdot 2H_2O$ | 3,6 A |
| D26 | $Ce(NO_3)_3/$ $Na_2EDTA$ | 0.25/0.25 | $CaSO_4 \cdot 2H_2O$ | 3,6 A |
| D1:.5 | $Ce(NO_3)_3/$ $Na_2EDTA$ | 4.7/4.7 | $CaSO_4 \cdot 2H_2O$ | 3,6 A |
| C3 | Free EDTA | Saturated | $CaSO_4 \cdot 2H_2O$ | 3,6 A |
| D36 | $Ce(NO_3)_3$/Free EDTA | 0.06/0.06 | $CaSO_4 \cdot 2H_2O$ | 3,6 A |
| D32 | $Ce(NO_3)_3$/Free EDTA | 1.4/0.6 | $CaSO_4 \cdot 2H_2O$ | 3,6 A |
| D38 | $Ce(NO_3)_3/$ $Na_2EDTA/$ Gelatin | 0.7/2/0.2 | $CaSO_4 \cdot 2H_2O$ | 3,6 A |
| C5 | $Pr_6O_{11}/Na_2EDTA$ | 3.1/16 | $CaSO_4 \cdot 2H_2O$ | 2,4 A |
| C5 | $Pr_6O_{11}/Na_2EDTA$ | 1.5/16 | $CaSO_4 \cdot 2H_2O$ | 2,4 A |
| A51 | $Pr(CF_3SO_3)_3$ | 1.5 | Deft Primer (Mistron 600) | 2,4 A |
| A68 | $Pr(CF_3SO_3)_3$ | 2.2 | Deft Primer (Mistron 600) | 2,5 A |
| A54 | $Pr(CF_3SO_3)_3$ | 1.5 | $CaSO_4 \cdot 2H_2O$ | 2,4 A |
| A59 | $Pr(CF_3SO_3)_3$ | 1 | $CaSO_4 \cdot 2H_2O$ | 2,4 A |
| A67 | $Pr(CF_3SO_3)_3$ | 2.2 | $CaSO_4 \cdot 2H_2O$ | 2,4 A |
| D71 | $Pr(NO_3)_3/$ $Pr(CF_3SO_3)_3$ | 1.5/2.2 | $CaSO_4 \cdot 2H_2O$ | 3,4 A |
| NH10 | $Li_2SO_4$ | 2.5 | $CaSO_4 \cdot 2H_2O$ | 3,4 A |
| NH11 | $Li_2SO_4$ | 2.5 | Deft Primer (Mistron 600) | 3,6 A |
| A10 | $Pr_6O_{11}$ | 3 | $CaSO_4$ (anhy.) | 3,5 A |
| A40 | $Pr_6O_{11}$ | 5 | $CaSO_4$ (anhy.) | 3,5 A |
| A22 | $Pr_6O_{11}$ | 1 | $CaSO_4 \cdot 2H_2O$ | 3,4 A |
| A23 | $Pr_6O_{11}$ | 5 | $CaSO_4 \cdot 2H_2O$ | 3,4 A |
| A41 | $Pr_6O_{11}$ | 3 | $CaSO_4 \cdot 2H_2O$ | 2,5 A |
| A25 | $Pr_6O_{11}$ | 3 | Nicron 604 | 3,6 A |
| A50 | $Pr_6O_{11}$ | 1.5 | Deft Primer (Mistron 600) | 3,6 A |
| 8-X6 | $Pr_6O_{11}$ | 1.5 | Deft Primer (Mistron 600) | 3,6 A |
| A70 | $Pr_6O_{11}$ | 5 | Deft Primer (Mistron 600) | 2,4 A |
| 8-X7 | $Pr_6O_{11}$ | 1.5 | $CaSO_4 \cdot 2H_2O$ | 3,6 A |
| A-69 | $Pr_6O_{11}$ | 5 | $CaSO_4 \cdot 2H_2O$ | 1,4 A |
| C4 | D,L-Methionine | 0.5 | $CaSO_4 \cdot 2H_2O$ | 3,6 A |
| C31 | D,L-Methionine | 0.5 | $CaSO_4 \cdot 2H_2O$ | 2,4 A |
| C9 | D,L-Methionine | 0.5 | $CaSO_4$ (anhy.) | 3,6 A |
| C11 | D,L-Methionine/ $Ce(NO_3)_3$ | 0.5/2 | $CaSO_4 \cdot 2H_2O$ | 3,6 A |
| C16 | D,L-Methionine/ $Ce(NO_3)_3$ | 0.5/1.5 | $CaSO_4 \cdot 2H_2O$ | 3,6 A |
| C17 | D,L-Methionine/ $Ce(NO_3)_3$ | 0.5/3 | $CaSO_4 \cdot 2H_2O$ | 3,6 A |
| D60 | D,L-Methionine/ $Ce(NO_3)_3$ | 0.5/3 | Deft Primer (Mistron 600) | 3,6 A |
| C10 | D,L-Methionine/ $Ce(NO_3)_3$ | 0.5/2 | $CaSO_4$ (anhy.) | 3,6 A |
| C21 | D,L-Methionine/ $Ce(NO_3)_3$ | 0.5/1.5 | $CaSO_4$ (anhy.) | 3,6 A |
| C22 | D,L-Methionine/ $Ce(NO_3)_3$ | 0.5/3 | $CaSO_4$ (anhy.) | 3,6 A |
| C6 | D,L-Methionine/ $Pr_6O_{11}$ | 3.1/3.1 | $CaSO_4 \cdot 2H_2O$ | 2,4 A |
| C15 | D,L-Methionine/ $Pr_6O_{11}$ | 0.5/1 | $CaSO_4 \cdot 2H_2O$ | 2,5 A |
| C8 | D,L-Methionine/ $Pr_6O_{11}$ | 0.5/3.1 | $CaSO_4 \cdot 2H_2O$ | 3,6 A |
| C35 | D,L-Methionine/ $Pr_6O_{11}/$ $Ce(NO_3)_3$ | 0.5/1.5/1.5 | $CaSO_4 \cdot 2H_2O$ | 2,4 A |
| C37 | L-Arginine/ $Ce(NO_3)_3$ | 1.5/1.5 | $CaSO_4 \cdot 2H_2O$ | 2,5 A |
| D57 | L-Arginine/ $Ce(NO_3)_3$ | 2/1 | $CaSO_4 \cdot 2H_2O$ | 2,5 A |
| D58 | L-Arginine/ $Ce(NO_3)_3$ | 2/1 | Deft Primer (Mistron 600) | 3,6 A |
| C40 | L-Arginine/ $Ce(NO_3)_3/Pr_6O_{11}$ | 1.5/1.5/1.5 | $CaSO_4 \cdot 2H_2O$ | 2,4 A |
| C38 | Cyclodextrin/ $Ce(NO_3)_3$ | 1.5/1.5 | $CaSO_4 \cdot 2H_2O$ | 2,5 A |
| C41 | Cyclodextrin/ $Ce(NO_3)_3/Pr_6O_{11}$ | 1.5/1.5/1.5 | $CaSO_4 \cdot 2H_2O$ | 2,5 A |
| C39 | Cyclodextrin/ $Ce(NO_3)_3$/EDTA | 1.5/1.5/1.5 | $CaSO_4 \cdot 2H_2O$ | 2,5 A |
| C42 | Cyclodextrin/ $Ce(NO_3)_3/$ $Pr_6O_{11}$/EDTA | 1.5/1.5/1.5/1.5 | $CaSO_4 \cdot 2H_2O$ | 2,5 A |
| 0179 | D,L-Methionine Sulfoxide | 0.5 | $CaSO_4 \cdot 2H_2O$ | 1 A |
| 0160 | L-Methionine Methylsulfonium Iodide | 0.5 | $CaSO_4 \cdot 2H_2O$ | 1 A |
| I162 | P11 + $Pr(NO_3)_3$ | 0.5 | $CaSO_4 \cdot 2H_2O$ | 2 A |
| I163 | CM23 + $Pr(NO_3)_3$ | 0.5 | $CaSO_4 \cdot 2H_2O$ | 2 A |
| C70 | Reilex | 1 | $CaSO_4 \cdot 2H_2O$ | 3,6 A |
| C72 | $Pr_6O_{11}$/Reilex | 1.5/1 | $CaSO_4 \cdot 2H_2O$ | 2,5 A |
| I2 | Methionine/Reilex | 1.5/1 | $CaSO_4 \cdot 2H_2O$ | 2,5 A |
| I3 | P11 | 1 | $CaSO_4 \cdot 2H_2O$ | 2,3 A |
| I4 | $Pr_6O_{11}$/P11 | 1.5/1 | $CaSO_4 \cdot 2H_2O$ | 1,4 A |
| I5 | Methionine/P11 | 1.5/1 | $CaSO_4 \cdot 2H_2O$ | 3,6 A |
| I6 | CM23 | 1 | $CaSO_4 \cdot 2H_2O$ | 2,4 A |
| I7 | PrFMS/CM23 | 1.5/1 | $CaSO_4 \cdot 2H_2O$ | 2,3 A |
| I8 | $Pr_6O_{11}$ CM23 | 1.5/1 | $CaSO_4 \cdot 2H_2O$ | 1 A |
| I9 | Methionine/CM23 | 1.5/1 | $CaSO_4 \cdot 2H_2O$ | 2,3 A |
| I10 | DE23 | 1 | $CaSO_4 \cdot 2H_2O$ | 2 A |

TABLE 3-continued

Panels Prepared and Evaluated

| Panel Number | Corrosion Inhibitor | Weight Percent Inhibitor Conc. | Extender/ Transport Enhancer | 2000 HRS Salt Fog Rating |
|---|---|---|---|---|
| Generation Vb | | | | |
| A136 | Pr$_2$O$_3$ | 1.5 | 10.5% CaSO$_4$•2H$_2$O | 1 A |
| A137 | Pr$_6$O$_{11}$-m | 1.5 | 10.5% CaSO$_4$•2H$_2$O | 1 A |
| A138 | PrO$_2$ | 1.5 | 10.5% CaSO$_4$•2H$_2$O | 1 A |
| A139 | Pr$_6$O$_{11}$ | 1.5 | 10.5% CaSO$_4$•2H$_2$O | 1 A |
| D140 | Ce(NO$_3$)$_3$ | .05 | 10.5% CaSO$_4$•H$_2$O | 3,5 A |
| A141 | Pr$_2$O$_3$ | 1.5 | 12.4% CaSO$_4$•2H$_2$O | 1 A |
| A142 | Pr$_6$O$_{11}$-m | 1.5 | 12.4% CaSO$_4$•2H$_2$O | 1 A |
| A143 | PrO$_2$ | 1.5 | 12.4% CaSO$_4$•2H$_2$O | 1 A |
| A144 | Pr$_6$O$_{11}$ | 1.5 | 12.4% CaSO$_4$•2H$_2$O | 1 A |
| D145 | Ce(NO$_3$)$_3$ | .05 | 12.4% CaSO$_4$•2H$_2$O | 3,5 A |
| A146 | Pr$_2$O$_3$ | 1.5 | 15.6% CaSO$_4$•2H$_2$O | 1 A |
| A147 | Pr$_6$O$_{11}$-m | 1.5 | 15.6% CaSO$_4$•2H$_2$O | 1 A |
| A148 | PrO$_2$ | 1.5 | 15.6% CaSO$_4$•2H$_2$O | 1 A |
| A149 | Pr$_6$O$_{11}$ | 1.5 | 15.6% CaSO$_4$•2H$_2$O | 1 A |
| A150 | Pr$_2$O$_3$ | 1.5 | 10.1% CaSO$_4$•2H$_2$O | 1 A |
| A151 | Pr$_2$O$_3$ | 0.4 | 10.1% CaSO$_4$•2H$_2$O | 1 A |
| A152 | Pr$_2$O$_3$ | 0.4 | 14.6% CaSO$_4$•2H$_2$O | 1 A |
| A153 | Pr$_2$O$_3$ | 3.7 | 13.4% CaSO$_4$•2H$_2$O | 1 A |
| Generation Vd | | | | |
| A220 | Pr$_2$(SO$_4$)$_3$ | 1.4 | 15% CaSO$_4$•2H$_2$O | 1 A |
| T221 | Tb$_3$O$_7$ | 1.4 | 15% CaSO$_4$•2H$_2$O | 1 A |
| 223 | Pr(OH)$_3$ | 1.4 | 15% CaSO$_4$•2H$_2$O | 1,4 A |
| 224 | Pr$_6$O$_{11}$ | 1.95 | 14.8% CaSO$_4$•2H$_2$O | 1 A |
| 225 | Pr$_6$O$_{11}$ | 5.6 | 14.2% CaSO$_4$•2H$_2$O | 1 A |
| 226 | Pr$_2$O$_3$ | 1.5 | 15% CaSO$_4$•2H$_2$O | 1 A |
| 227 | Pr$_6$O$_{11}$ | 22.4 | 0% CaSO$_4$•2H$_2$O | 2,5 A |
| 228 | Pr$_2$O$_3$/Pr$_6$O$_{11}$/ PrSO$_4$/D,L Methionine | 1.4/1.4/ 0.8/.25 | 14% CaSO$_4$•2H$_2$O | 1 A |
| 229 | PrO$_2$/ Glycine | 0.4/1.1 | 15% CaSO$_4$•2H$_2$O | 1 A |
| 230 | D-Methionine | 1.1 | 15.2% CaSO$_4$•2H$_2$O | 1 A |
| 231 | D,L-Methionine | 0.5 | 15.4% CaSO$_4$•2H$_2$O | 1 A |
| 232 | D,L-Methionine | 1.5 | 15% CaSO$_4$•2H$_2$O | 1 A |
| 233 | L-Cystiene | 1.1 | 15.2% CaSO$_4$•2H$_2$O | 1 A |
| 234 | D,L-Methionine Sulfoxide | 1.1 | 15.2% CaSO$_4$•2H$_2$O | 1 A |
| 235 | L-Arginine | 1.1 | 15.2% CaSO$_4$•2H$_2$O | 1 A |
| 237 | Pr$_6$O$_{11}$ | 1.5 | 15% CaSO$_4$•2H$_2$O | 1 A |
| 238 | Pr$_2$O$_3$ | 1.5 | 15% CaSO$_4$•2H$_2$O | 1 A |
| 239 | Pr$_6$O$_{11}$ | 1.5 | 19.5% BaSO$_4$ | 3,5 A |
| 240 | Pr$_2$O$_3$ | 1.5 | 19.5% BaSO$_4$ | 3,5 A |
| 241 | Pr$_6$O$_{11}$ | 1.5 | 17.3% SrSO$_4$ | 1 A |
| 242 | Pr$_2$O$_3$ | 1.5 | 17.3% SrSO$_4$ | 1 A |
| 243 | Pr$_6$O$_{11}$ | 1.5 | 15% MgSO$_4$ | Not Tested |
| 244 | Pr$_2$O$_3$ | 1.5 | 15% MgSO$_4$ | Not Tested |
| Generation IV | | | | |
| D80 | Basic Extender | 45 | Deft (Mistron 600) | 3,5 A |
| D84 | CaSO$_4$•2H$_2$O | 45 | 10.6% CaSO$_4$•2H$_2$O | 1,4 A |
| 1 | CaSO$_4$•2H$_2$O | 100 | 10.6% CaSO$_4$•2H$_2$O | 1,4 A |
| 54 | SrSO$_4$ | 100 | SrSO$_4$ | 1 A |
| RA 420A | CaSO$_4$•2H$_2$O | 77 | 10.6% CaSO$_4$•2H$_2$O | 1,5 A |
| RA 420E | SrSO$_4$•2H$_2$O | 85 | SrSO$_4$•2H$_2$O | 1,5 A |
| A81 | Pr(CF$_3$SO$_3$)$_3$ | 1.5 | Deft (Mistron 600) | 3,4 A |
| A82 | Pr$_6$O$_{11}$ | 1.5 | Deft (Mistron 600) | 3,4 A |
| A83 | Pr(CF$_3$SO$_3$)$_3$ | 0.7 | Deft (Mistron 600) | 3,4 A |
| A85 | Pr(CF$_3$SO$_3$)$_3$ | 1.5 | 10.6% CaSO$_4$•2H$_2$O | 2 A |
| A86 | Pr$_6$O$_{11}$ | 1.5 | 10.6% CaSO$_4$•2H$_2$O | 1,4 A |
| A87 | Pr$_6$O$_{11}$ | 3 | 10.6% CaSO$_4$•2H$_2$O | 1 A |
| C88 | Pr$_6$O$_{11}$/ D,L-Methionine/ L-Arginine | 1.5/ 0.5/0.5 | 10.6% CaSO$_4$•2H$_2$O | 1 A |
| C89 | D,L-Methionine/ L-Arginine | 0.5/0.5 | 10.6% CaSO$_4$•2H$_2$O | 1 A |
| D90 | Ce(NO$_3$)$_3$ | 0.5 | 10.6% CaSO$_4$•2H$_2$O | 1 A |
| C91 | Ce(NO$_3$)$_3$/ L-Arginine | 0.5/0.5 | 10.6% CaSO$_4$•2H$_2$O | 2 A |
| A92 | Ce(NO$_3$)$_3$/Pr$_6$O$_{11}$ | 0.51/1 | 10.6% CaSO$_4$•2H$_2$O | 2,4 A |
| A93 | Pr(CF$_3$SO$_3$)$_3$ | 3 | 12.3% CaSO$_4$•2H$_2$O | 2 A |
| A94 | Pr$_6$O$_{11}$ | 1.5 | 12.3% CaSO$_4$•2H$_2$O | 1 A |
| A95 | Pr$_6$O$_{11}$ | 3 | 12.3% CaSO$_4$•2H$_2$O | 1,4 A |
| C96 | D,L-Methionine/ L-Arginine | 0.5/0.5 | 12.3% CaSO$_4$•2H$_2$O | 1 A |
| C97 | Ce(NO$_3$)$_3$/ L-Arginine | .05/0.5 | 12.3% CaSO$_4$•2H$_2$O | 2 A |
| A98 | Pr$_6$O$_{11}$ | 3 | 12.3% CaSO$_4$•2H$_2$O | 1 A |
| Generation Vc | | | | |
| 199 | — | 0 | 15.6% CaSO$_4$•2H$_2$O | 2 A |
| A200 | Pr$_2$O$_3$ | 1.4 | 15% CaSO$_4$•2H$_2$O | 1 A |
| A201 | Pr$_2$O$_3$ | 2.8 | 14.5% CaSO$_4$•2H$_2$O | 1 A |
| A202 | Pr$_2$O$_3$ | 3.7 | 14.1% CaSO$_4$•2H$_2$O | 1 A |
| A201 | Pr$_2$O$_3$ hand mixed | 1.5 | 15% CaSO$_4$•2H$_2$O | 1 A |
| A204 | PrO$_2$ | 1.4 | 15% CaSO$_4$•2H$_2$O | 1 A |
| A205 | PrO$_2$ | 2.2 | 14.7% CaSO$_4$•2H$_2$O | 2 A |
| A206 | PrO$_2$ - hand mixed | 1.5 | 15% CaSO$_4$•2H$_2$O | 1 A |
| A207 | PrO$_2$ + Pr$_2$O$_3$ | 1.4 | 15% CaSO$_4$•2H$_2$O | 1 A |
| A208 | PrO$_2$ + Pr$_2$O$_3$ | 2.2 | 14.7% CaSO$_4$•2H$_2$O | 1 A |
| A209 | PrO$_2$ + Pr$_2$O$_3$ hand mixed | 1.5 | 15% CaSO$_4$•2H$_2$O | 1 A |
| A210 | Pr$_6$O$_{11}$ | 1.4 | 15% CaSO$_4$•2H$_2$O | 1 A |
| A211 | Pr$_6$O$_{11}$ | 2.8 | 14.5% CaSO$_4$•2H$_2$O | 1 A |
| A212 | Pr$_6$O$_{11}$ | 3.7 | 14.1% CaSO$_4$•2H$_2$O | 1 A |

TABLE 3-continued

Panels Prepared and Evaluated

| Panel Number | Corrosion Inhibitor | Weight Percent Inhibitor Conc. | Extender/ Transport Enhancer | 2000 HRS Salt Fog Rating |
|---|---|---|---|---|
| A213 | $Pr_6O_{11}$ - hand mixed | 1.5 | 15% $CaSO_4 \cdot 2H_2O$ | 1 A |
| O214 | D,L-Methionine | 0.5 | 15.4% $CaSO_4 \cdot 2H_2O$ | 1 A |
| O215 | D,L-Methionine/ $Pr_6O_{11}$ | 0.5/1.4 | 14.8% $CaSO_4 \cdot 2H_2O$ | 1 A |
| I216 | CM23/$Pr_6O_{11}$ | 0.5/2.6 | 14.3% $CaSO_4 \cdot 2H_2O$ | 2 A |
| A219 | $Pr_6O_{11}$ | 1.4 | 15% $CaSO_4 \cdot 2H_2O$ | 1 A |

EXAMPLE 13

Enhanced Self-priming Topcoat Base Formulation

Enhanced self-priming topcoat base formulations comprising one or more Group I A or Group II A, and/or yttrium, and/or lanthanide compounds, such as metal sulfates, metal phosphates, metal nitrates, and/or metal silicates and the like; and optionally one or more co-inhibitors such as, rare earth compounds, metal oxides, borates, metaborates, silicates, phosphates, phosphonates, aniline, polyaniline, and the like, were prepared. An exemplary formulation is shown below in Table 4.

TABLE 4

Enhanced Self-Priming Topcoat Base Formulation

| Component | Mass (g) |
|---|---|
| Polyester Resin Blend (binder) | 130 |
| Fluorinated Resin Blend (binder) | 240 |
| Dispersing Agent | 6 |
| Ketone Solvent | 77 |
| VOC Exempt Solvents | 5 |
| Color Pigments | 45 |
| Corrosion Inhibitive Pigments | 310 |
| Extender Pigments | 74 |
| Base Total: | 1000 |

According to the present invention, direct to metal coatings and enhanced direct to metal coatings were prepared with the base formulations described herein. The coating compositions also included an isocyanate catalyst, that is, a two-part formulation, such as isocyanate solution 97GY088CAT, available from Deft Inc., having offices in Irvine, Calif. The direct to metal coatings and enhanced direct to metal coatings, shown herein by way of example, were prepared by adequately stirring appropriate amounts of isocyanate catalyst into the base formulations described above. The amount of isocyanate catalyst included in the coating compositions was added according to the amount recommended by the supplier to ensure proper curing and cross-linking of the resulting coating. The solvent employed in the preparation of the coating system of the present invention was chosen in such a manner as to facilitate the preparation of the coating mixture, to provide suitable application properties, and to provide an environmentally acceptable paint.

Once the base and isocyanate catalyst were mixed together, the direct to metal coatings and enhanced direct to metal coatings were substrates. Tests were run on various sample formulations, according to ASTM B117 procedure, for either 1000, 2000, or 3000 hours. The results were evaluated according to the Keller Corrosion Rating Scale. Examples of coating formulations that were prepared and evaluated are provided below.

Test Procedure

The coating compositions tested were sprayed onto different metal substrates and allowed to dry (cure) naturally over time, typically about one week. Edges and backs of samples were taped and front surfaces were scribed with an "X" pattern according to ASTM B117 procedure. Results are shown in Tables 5-7.

TABLE 5

Non-chromium Inhibitor Containing Primer Plus Topcoat.

| Sample Number | *Deft Primer | *Deft Topcoat | **Weight Percent Corrosion Inhibitor in Topcoat | 2000 Hour Salt Fog Rating |
|---|---|---|---|---|
| 396 | 44GY030 | 99GY001 | None | 3,6 |
| 397 | 44GY030 | 99GY001 | 9% $Pr_6O_{11}$ | 3,6 |
| 421 | 44GY030 | 99W009 | None | 3,5 |
| 386 | 44GY030 | 99W009 | 9% $Pr_2O_3$ | 3,6 |
| 401 | 44GY030 | 99W009 | 9% $CeO_2$ | 3,6 |
| 399 | 44BK016 | 99GY001 | 9% $Pr_6O_{11}$ | 3,4 |

*Deft Primer and Deft Topcoat numbers refer to product identification numbers of primer and topcoat formulations, available from Deft Inc., having offices in Irvine, California.
**Weight percent inhibitor pigment based on total weight percent of fully catalyzed and sprayable topcoat.

TABLE 6

Self-priming Topcoat Formulations.

| Sample Number | *Deft Primer | Weight Percent Extender | **Weight Percent Inhibitor in Topcoat | 2000 Hours Salt Fog Rating |
|---|---|---|---|---|
| A-5-A | 03W211 | 44 $CaSO_4 \cdot 2H_2O$ | 8% $Pr_2O_3$ | 3,5 |

*Deft Primer number refers to product identification number of primer formulation, available from Deft Inc., having offices in Irvine, California.
**Weight percent inhibitor pigment based on total weight percent of fully catalyzed and sprayable topcoat.

TABLE 7

Enhanced Self-priming Topcoat Formulations.

| Sample Number | *Deft Coating | **Corrosion Inhibitor/ Weight Percent | | **Color Pigment/ Weight Percent | | ***Extender/ Weight Percent | | 2000 Hr Salt Fog Rating |
|---|---|---|---|---|---|---|---|---|
| 139-057(A) | 97GY088 | $Pr_2O_3$ | 12.89 | Titanium Dioxide | 13.89 | Lo-Vel ® HSF | 25.17 | 1A |
| | | $CaSO_4 \cdot 2H_2O$ | 47.74 | Iron Yellow Oxide | 0.17 | | | |
| | | | | Carbazole Violet | 0.01 | | | |
| | | | | Phthalo Blue | 0.03 | | | |

TABLE 7-continued

Enhanced Self-priming Topcoat Formulations.

| Sample Number | *Deft Coating | **Corrosion Inhibitor/ Weight Percent | | **Color Pigment/ Weight Percent | | ***Extender/ Weight Percent | | 2000 Hr Salt Fog Rating |
|---|---|---|---|---|---|---|---|---|
| 139-059(A) | 97GY089 | $Pr_2O_3$ | 2.14 | Titanium Dioxide | 13.26 | Lo-Vel ® HSF | 24.01 | 1A |
| | | $CaSO_4 \cdot 2H_2O$ | 42.45 | Iron Yellow Oxide | 0.18 | | | |
| | | $Pr_2(SO_4)_3$ | 0.85 | Carbon Black | 0.10 | | | |
| | | $Pr_6O_{11}$ | 16.98 | Phthalo Blue | 0.03 | | | |
| 139-058(A) | 97GY089 | $Pr_6O_{11}$ | 23.62 | Titanium Dioxide | 12.83 | Lo-Vel ® HSF | 23.23 | 2A |
| | | $CaSO_4 \cdot 2H_2O$ | 40.03 | Iron Yellow Oxide | 0.16 | | | |
| | | | | Carbazole Violet | 0.09 | | | |
| | | | | Phthalo Blue | 0.03 | | | |
| 148-079(A) | 97GY089 | $Pr_2O_3$ | 2.49 | Titanium Dioxide | 10.25 | Lo-Vel ® HSF | 17.48 | 1A |
| | | $CaSO_4 \cdot 2H_2O$ | 48.97 | Iron Yellow Oxide | 0.13 | | | |
| | | $Pr_2(SO_4)_3$ | 0.99 | Carbazole Violet | 0.01 | | | |
| | | $Pr_6O_{11}$ | 19.58 | Carbon Black | 0.07 | | | |
| | | | | Phthalo Blue | 0.03 | | | |
| 148-097(A) | 97GY128 | $Pr_2O_3$ | 1.54 | Titanium Dioxide | 18.85 | Lo-Vel ® HSF | 35.69 | 3A |
| | | $CaSO_4 \cdot 2H_2O$ | 30.63 | Iron Yellow Oxide | 0.24 | | | |
| | | $Pr_2(SO_4)_3$ | 0.61 | Carbazole Violet | 0.01 | | | |
| | | $Pr_6O_{11}$ | 12.25 | Carbon Black | 0.13 | | | |
| | | | | Phthalo Blue | 0.05 | | | |
| 148-078(A) | 97GY121 | $Pr_2O_3$ | 14.98 | Titanium Dioxide | 10.82 | Lo-Vel ® HSF | 18.47 | 1A |
| | | $CaSO_4 \cdot 2H_2O$ | 55.48 | Iron Yellow Oxide | 0.14 | | | |
| | | | | Carbazole Violet | 0.01 | | | |
| | | | | Carbon Black | 0.07 | | | |
| | | | | Phthalo Blue | 0.03 | | | |
| 148-084(A) | 97GY124 | $Pr_2O_3$ | 2.14 | Titanium Dioxide | 19.45 | Lo-Vel ® HSF | 36.85 | 3A |
| | | $CaSO_4 \cdot 2H_2O$ | 42.45 | Iron Yellow Oxide | 0.24 | | | |
| | | $Pr_2(SO_4)_3$ | 0.85 | Carbazole Violet | 0.01 | | | |
| | | $Pr_6O_{11}$ | 16.98 | Carbon Black | 0.13 | | | |
| | | | | Phthalo Blue | 0.05 | | | |

*Deft Coating number refers to product identification number of coating formulation, available from Deft Inc., having offices in Irvine, California.

As shown in Tables 5-7, incorporating extenders in conjunction rare earth corrosion inhibitors into the enhanced self-priming topcoat results in coating compositions with good or excellent performance. As shown in Table 7, the extenders in conjunction with the rare earth corrosion inhibitors when incorporated into the enhanced self-priming topcoat, provides the best corrosion resistance. As shown in Table 5, incorporating corrosion inhibitors directly into a topcoat and applying over a non-chrome primer, results in coating systems that do not perform as well as the coatings shown in Table 7. As shown in Table 6, the corrosion resistance of the self-priming topcoat with extenders and rare earth compound corrosion inhibitors is comparable to the performance of the non-chrome primer and topcoat formulations shown in Table 5. Thus, the self-priming topcoat compositions, according to the present invention, can achieve similar performance to systems that use both a non-chrome primer and a topcoat, without the use of a primer. Further, as shown in Table 7, the enhanced self-priming topcoats perform better than the non-chrome primer plus topcoat systems, thus providing better corrosion protection as a one-coat system without the need for a inter-coat polymeric coating or primer.

Accordingly, the enhanced self-priming topcoats have both excellent weathering resistance and durability, as well as the corrosion resistance necessary to provide protection to underlying substrates.

Further, the coating compositions according to the present invention are non-chromium containing and are environmentally superior to currently known chromium containing coating systems. Finally the self-priming topcoat and enhanced self-priming topcoat compositions provide corrosion protection as a one-coat system without the need for an inter-coat polymeric coating or primer, thus minimizing the production time and costs of producing industrial, consumer, and military parts and goods.

CONCLUSION

Controlling the local environment near the primer and substrate interface is known to be important for maximum corrosion protection. Local pH and ionic activity can be modified in a favorable way by incorporating the various components described herein in the coating, including neutral to slightly acidic generating extenders, generating acidic extenders and/or rare earth compounds, alone or in combination with each other and/or with other materials such as polymeric resin binders, ionic exchange resins, and so forth. The coating compositions described herein have good adhesion to substrates such as metals, including aluminum and aluminum alloys. These novel coatings, coating systems and associated processes provide viable alternatives to coatings containing chromates as they are environmentally superior to currently know chromium containing coating systems.

All publications, patents and patent applications are incorporated herein by reference. While in the foregoing specification, this invention has been described in relation to certain preferred embodiments thereof, and many details have been set forth for purposes of illustration, it will be apparent to those skilled in the art that the invention is susceptible to additional embodiments and that certain of the details herein can be varied considerably without departing from the basic principles of the invention. Therefore, it is manifestly intended that this invention be limited only by the claims and the equivalents thereof.

What is claimed is:

1. A non-chromate containing corrosion inhibiting coating composition comprising:

one or more organic binders; and
solid components comprising:
 a praseodymium oxide selected from the group consisting of oxides, mixed oxides, solid solution oxides, hydrated oxides, hydroxides, and combinations thereof;
 one or more substantially insoluble extenders selected from the group consisting of a neutral to slightly acidic generating extender, an acidic generating extender, and combinations thereof;
wherein the solid components comprise about 1 wt % to about 40 wt % of the praseodymium oxide;
wherein the non-chromate containing composition is capable of curing naturally and, upon curing, is capable of generating a pH between about 2 and about 8 at an interface between the composition and a substrate.

2. The composition of claim 1 wherein the solid components further comprise a rare earth compound selected from the group consisting of rare earth oxides, mixed oxides, solid solution oxides, hydroxides, hydrated oxides, salts, triflates, complexes and combinations thereof.

3. The composition of claim 2 wherein the rare earth compound is an anhydrous or hydrated oxide.

4. The composition of claim 2 wherein the rare earth compound comprises one or more metal cations selected from the group consisting of praseodymium, terbium, cerium, samarium, ytterbium, yttrium, neodymium and combinations thereof.

5. The composition of claim 2 wherein the rare earth compound is selected from the group consisting of cerium oxide, cerium hydroxide, cerium mixed oxide, cerium oxide mixture, cerium salt, neodymium oxide, neodymium hydroxide, neodymium oxide mixture, neodymium salt, praseodymium oxide, praseodymium hydroxide, praseodymium mixed oxide, praseodymium oxide mixture, praseodymium salt, ytterbium oxide, ytterbium hydroxide, ytterbium oxide mixture, ytterbium salt, yttrium oxide, yttrium hydroxide, yttrium mixed oxide, yttrium oxide mixture, yttrium salt, terbium oxide, terbium hydroxide, terbium mixed oxide, terbium oxide mixture, terbium salt, and combinations thereof.

6. The composition of claim 2 wherein the rare earth compound is a praseodymium compound.

7. The composition of claim 2 wherein the rare earth compound is a rare earth carbonate or a rare earth triflate.

8. The composition of claim 1 wherein the praseodymium oxide is selected from the group consisting of praseodymium (III), praseodymium(III/IV), praseodymium(IV) oxides and mixtures thereof.

9. The composition of claim 8 wherein the solid components further comprise one or more extenders selected from the group consisting of a neutral to slightly acidic generating extender.

10. The composition of claim 9 wherein at least one of the one or more extenders is calcium sulfate.

11. The composition of claim 10 wherein the calcium sulfate is selected from the group consisting of hydrous calcium sulfate, anhydrous calcium sulfate and combinations thereof.

12. The composition of claim 1 wherein the praseodymium oxide is a praseodymium(III) oxide.

13. The composition of claim 1 wherein the praseodymium oxide is a praseodymium(III/IV) oxide.

14. The composition of claim 1 wherein the praseodymium oxide is a praseodymium(IV) oxide.

15. The composition of claim 1 wherein the solid components comprise about 1 wt % to about 28 wt % of the praseodymium oxide.

16. The composition of claim 1 wherein the solid components comprise about 3 wt % to about 28 wt % of the praseodymium oxide.

17. The composition of claim 1 wherein at least one of the one or more substantially insoluble extenders is a sulfur, phosphorus or silicon oxyanion-containing salt.

18. The composition of claim 1 wherein the composition is selected from the group consisting of aqueous, solvent-based, and powder coating compositions.

19. The composition of claim 1 wherein the composition is an aqueous composition.

20. The composition of claim 1 wherein at least one of the one or more organic binders is selected from the group consisting of epoxy, urethane, urea, acrylate, alkyd, melamine, polyester, vinyl, vinyl ester, organo-silicone, organo-siloxane, organo-silicate, organo-sulfide, organo-sulfone, epoxy novolac, epoxy phenolic, amides, drying oils, and hydrocarbon polymers.

21. The composition of claim 1 wherein at least one of the one or more organic binders is an epoxy-based resin binder.

22. The composition of claim 1 wherein the solid components further comprise a material selected from the group consisting of linear and cyclic dextrins, triflic acid, triflates, acetates, talc, kaolin, organic-based ion exchange resins, and combinations thereof.

23. The composition of claim 22 comprising about 0.03 to about 5 wt % cyclodextrin, about 0.1 to about 0.5 wt % triflic acid, or about 0.1 to about 5 wt % ionic exchange resin.

24. The composition of claim 1 wherein the solid components further comprise material selected from the group consisting of gelatin and gelatin derivatives.

25. The composition of claim 24 comprising about 0.03 to about 5 wt % gelatin.

26. The composition of claim 1 wherein the solid components further comprise a material selected from the group consisting of amino acids, amino acid derivatives and combinations thereof.

27. The composition of claim 26 wherein the amino acid is selected from the group consisting of glycine, arginine, and methionine.

28. The composition of claim 26 wherein the amino acid derivative is methionine sulfoxide or methionine methyl sulfoxide.

29. The composition of claim 26 comprising about 0.1 to about 5 wt % amino acid.

30. The composition of claim 1 wherein the solid components further comprise a coloring pigment.

31. The composition of claim 30 wherein the coloring pigment is $TiO_2$.

32. The composition of claim 1 wherein the praseodymium mixed oxide is $Pr_6O_{11}$.

33. The composition of claim 32 wherein the $Pr_6O_{11}$ is present in amounts of about 1 wt % to about 28 wt % of the solid components.

34. The composition of claim 32 wherein the $Pr_6O_{11}$ is present in amounts of about 3 wt % to about 28 wt % of the solid components.

35. A non-chromate containing corrosion inhibiting composition comprising:
one or more binders; and
solid components comprising:
 about 1 wt % to about 40 wt % one or more rare earth oxides; and
 one or more substantially insoluble extenders selected from the group consisting of calcium sulfate, strontium sulfate, and combinations thereof;

wherein the non-chromate containing composition is capable of curing naturally and, upon curing, is capable of generating a pH between about 2 and about 8 at an interface between the composition and a substrate.

36. The composition of claim 35, wherein the calcium sulfate is hydrous calcium sulfate or anhydrous calcium sulfate.

37. The composition of claim 35, wherein the solid components comprise about up to about 99 wt % of at least one of the one or more substantially insoluble extenders.

38. The composition of claim 35, wherein the solid components comprise about up to about 75 wt % of at least one of the one or more substantially insoluble extenders.

39. The composition of claim 35 wherein at least one of the rare earth oxides comprises a metal cation selected from the group consisting of praseodymium, terbium, cerium, samarium, ytterbium, yttrium, neodymium and combinations thereof.

40. The composition of claim 35 wherein at least one of the one or more rare earth oxides is a praseodymium compound.

41. The composition of claim 40 wherein the praseodymium oxide is selected from the group consisting of praseodymium(III), praseodymium(III/IV), praseodymium (IV) oxides and combinations thereof.

42. The composition of claim 40 wherein the praseodymium oxide is a praseodymium(III) oxide.

43. The composition of claim 40 wherein the praseodymium oxide is a praseodymium(III) oxide, a praseodymium (III/IV) oxide or a praseodymium (IV) oxide.

44. The composition of claim 40 wherein the praseodymium oxide is a praseodymium(III/IV) oxide.

45. The composition of claim 40 wherein the praseodymium compound is a praseodymium(IV) compound.

46. The composition of claim 35 wherein the composition is selected from the group consisting of aqueous, solvent-based, and powder coating compositions.

47. The composition of claim 35 wherein at least one of the one or more binders is an organic polymer selected from the group consisting of epoxy, urethane, urea, acrylate, alkyd, melamine, polyester, vinyl, vinyl ester, organo-silicone, organo-siloxane, organo-silicate, organo-sulfide, organo-sulfone, polysulfide, epoxy novolac, epoxy phenolic, amides, drying oils, and hydrocarbon polymers.

48. The composition of claim 35 wherein at least one of the one or more binders is an epoxy-based resin binder.

49. The composition of claim 35 wherein at least one of the one or more binders is an inorganic polymer selected from the group consisting of silicone, siloxane and silicate polymers.

50. The composition of claim 35 wherein the solid components further comprise a coloring pigment.

51. The composition of claim 50 wherein the coloring pigment is $TiO_2$.

52. The composition of claim 35 wherein at least one of the rare earth oxides is an oxide, mixed oxide or combination thereof.

53. The composition of claim 52 wherein the solid components further comprise a second rare earth compound selected from the group consisting of rare earth oxides, mixed oxides, solid solution oxides, hydroxides, hydrated oxides, salts, triflates, complexes and combinations thereof.

54. A non-chromate containing corrosion inhibiting primer composition comprising:
one or more organic binders; and
solid components comprising:
a praseodymium (III/IV) mixed oxide;
one or more substantially insoluble extenders selected from the group consisting of a neutral to slightly acidic generating extender, an acidic generating extender, and combinations thereof;
wherein the solid components comprise about 1 wt % to about 40 wt % of the praseodymium (III/IV) mixed oxide;
wherein the non-chromate containing composition is capable of curing naturally and, upon curing, is capable of generating a pH between about 2 and about 8 at an interface between the composition and a substrate.

55. The composition of claim 54 wherein the composition is selected from the group consisting of aqueous, solvent-based, and powder coating compositions.

56. The composition of claim 54 wherein at least one of the one or more organic binders is selected from the group consisting of epoxy, urethane, urea, acrylate, alkyd, melamine, polyester, vinyl, vinyl ester, organo-silicone, organo-siloxane, organo-silicate, organo-sulfide, organo-sulfone, polysulfide, epoxy novolac, epoxy phenolic, amides, drying oils, and hydrocarbon polymers.

57. The composition of claim 54 wherein at least one of the one or more organic binders is an epoxy-based resin binder.

58. The composition of claim 54 wherein the solid components further comprise a coloring pigment.

59. The composition of claim 58 wherein the coloring pigment is $TiO_2$.

60. The composition of claim 54 wherein the solid components further comprise an additional rare earth compound selected from the group consisting of rare earth oxides, mixed oxides, solid solution oxides, hydroxides, hydrated oxides, salts, triflates, complexes and combinations thereof.

61. A non-chromate containing corrosion inhibiting coating composition comprising:
one or more binders; and
solid components comprising:
one or more rare earth element oxides selected from the group consisting of oxides, mixed oxides, solid solution oxides, hydrated oxides and hydroxides; and
a praseodymium oxide selected from the group consisting of oxides, mixed oxides, solid solution oxides, hydrated oxides, hydroxides, and combinations thereof;
one or more substantially insoluble extenders selected from the group consisting of a neutral to slightly acidic generating extender, an acidic generating extender, and combinations thereof;
wherein the praseodymium oxide is present in an amount of about 1 wt % to about 40 wt % of the solid components;
wherein the non-chromate containing composition is capable of curing naturally and, upon curing, is capable of generating a pH between about 2 and about 8 at an interface between the composition and a substrate.

62. The composition of claim 61 wherein the praseodymium oxide is selected from the group consisting of $PrO_2$, $Pr_2O_3$, $Pr_6O_{ii}$ and combinations thereof.

63. The composition of claim 61 wherein at least one of the one or more rare earth element oxides is a rare earth praseodymium oxide or a rare earth terbium oxide.

64. The composition of claim 61 wherein at least one of the one or more rare earth element oxides is selected from the group consisting of $Y_2O_3$; $La_2O_3$, $CeO_2$, $Pr(OH)_3$, $PrO_2$, $Pr_2O_3$, $Pr_6O_{11}$, $Nd_2O_3$, $Sm_2O_3$, $Tb_4O_7$, and $Yb_2O_3$.

65. A non-chromate containing corrosion inhibiting coating composition comprising:

one or more binders; and solid components comprising:

about 1 wt % to about 40 wt % one or more rare earth element oxides selected from the group consisting of oxides, mixed oxides, solid solution oxides, hydrated oxides, and hydroxides; and one or more extenders selected from the group consisting of calcium sulfate, strontium sulfate, and combinations thereof;

wherein the non-chromate containing composition is capable of curing naturally and, upon curing, is capable of generating a pH between about 2 and about 8 at an interface between the composition and a substrate.

66. The composition of claim 65 wherein at least one of the one or more rare earth element oxides is an anhydrous praseodymium oxide.

67. A method for preparing a non-chromate containing coating composition comprising:

preparing a paint formulation; and adding an effective corrosion-inhibiting amount of a rare earth oxide and one or more extenders selected from the group consisting of calcium sulfate, strontium sulfate, and combinations thereof to the paint formulation to produce a non-chromate containing coating composition;

wherein the rare earth oxide is present in an amount between about 1 wt % to about 40 wt % of solid components comprising the rare earth oxide and one or more extenders wherein the non-chromate containing composition is capable of curing naturally and, upon curing, is capable of generating a pH between about 2 and about 8 at an interface between the composition and a substrate.

68. The method of claim 67 further comprising pre-dispersing the rare earth compound with a dispersant.

69. The method of claim 67 wherein the rare earth oxide is a praseodymium(III/IV) oxide.

70. The method of claim 67 wherein the one or more extenders are substantially insoluble.

71. The method of claim 67 wherein the rare earth oxide is a praseodymium oxide or praseodymium mixed oxide.

72. The method of claim 71 wherein the praseodymium mixed oxide is $Pr_6O_{11}$.

73. The method of claim 67 further comprising adding a material selected from the group consisting of amino acids, derivates of amino acids, and combinations thereof to the paint formulation.

74. The method of claim 67 further comprising adding a material selected from the group consisting of gelatin, gelatin derivatives, and combinations thereof to the paint formulation.

75. A method for preparing a non-chromate containing coating composition comprising:

preparing a paint formulation comprised of an organic binder; and adding an effective corrosion-inhibiting amount of a solid component comprising:

a praseodymium compound selected from the group consisting of oxides, mixed oxides, solid solution oxides, hydrated oxides, hydroxides, and combinations thereof to the paint formulation to produce a coating composition one or more substantially insoluble extenders selected from the group consisting of a neutral to slightly acidic generating extender, an acidic generating extender, and combinations thereof;

wherein the praseodymium compound comprises about 1 wt % to about 40 wt % of the solid components;

wherein the non-chromate containing composition is capable of curing naturally and, upon curing, is capable of generating a pH between about 2 and about 8 at an interface between the composition and a substrate.

76. The method of claim 75 wherein the praseodymium compound is $Pr_6O_{11}$.

77. The method of claim 75 wherein the solid components further comprise an additional rare earth compound selected from the group consisting of rare earth oxides, mixed oxides, solid solution oxides, hydroxides, hydrated oxides, salts, triflates, complexes and combinations thereof to the paint formulation.

78. The method of claim 75 further comprising the step of pre-dispersing the praseodymium compound with a dispersant.

* * * * *

UNITED STATES PATENT AND TRADEMARK OFFICE
CERTIFICATE OF CORRECTION

PATENT NO. : 7,759,419 B2  Page 1 of 1
APPLICATION NO. : 10/758972
DATED : July 20, 2010
INVENTOR(S) : James Stoffer et al.

It is certified that error appears in the above-identified patent and that said Letters Patent is hereby corrected as shown below:

In the Claims:
Column 36
Claim 62, line 3: replace "$Pr_6O_{ii}$" with --$Pr_6O_{11}$--

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,759,419 B2 Page 1 of 1
APPLICATION NO. : 10/758972
DATED : July 20, 2010
INVENTOR(S) : James Stoffer et al.

It is certified that error appears in the above-identified patent and that said Letters Patent is hereby corrected as shown below:

In the Claims:
Column 36, line 58
(Claim 62, line 3) replace "$Pr_6O_{ii}$" with --$Pr_6O_{11}$--

This certificate supersedes the Certificate of Correction issued September 14, 2010.

Signed and Sealed this

Second Day of November, 2010

David J. Kappos
*Director of the United States Patent and Trademark Office*